US012547687B2

United States Patent
Li et al.

(10) Patent No.: US 12,547,687 B2
(45) Date of Patent: Feb. 10, 2026

(54) SYSTEM AND METHOD FOR BIOMETRIC AUTHENTICATION

(71) Applicant: ZKTeco USA, Alpharetta, GA (US)

(72) Inventors: Zhinong Li, East Brunswick, NJ (US); Xiaowu Zhang, East Brunswick, NJ (US)

(73) Assignee: ZKTECO USA, Alpharetta, GA (US)

( * ) Notice: Subject to any disclaimer, the term of this patent is extended or adjusted under 35 U.S.C. 154(b) by 778 days.

(21) Appl. No.: 17/361,687

(22) Filed: Jun. 29, 2021

(65) Prior Publication Data

US 2021/0406353 A1 Dec. 30, 2021

Related U.S. Application Data

(60) Provisional application No. 63/045,506, filed on Jun. 29, 2020.

(51) Int. Cl.
*G06F 21/32* (2013.01)
*G06N 20/00* (2019.01)
*G06V 40/50* (2022.01)
*G06V 40/70* (2022.01)

(52) U.S. Cl.
CPC ............ *G06F 21/32* (2013.01); *G06N 20/00* (2019.01); *G06V 40/50* (2022.01); *G06V 40/70* (2022.01); *G06T 2207/10048* (2013.01)

(58) Field of Classification Search
None
See application file for complete search history.

(56) References Cited

U.S. PATENT DOCUMENTS

| 8,184,866 | B2 | 5/2012 | Takaku et al. | |
|---|---|---|---|---|
| 11,068,069 | B2* | 7/2021 | Page | G06N 3/045 |
| 2013/0015946 | A1* | 1/2013 | Lau | G06V 40/172 340/5.2 |
| 2017/0270356 | A1* | 9/2017 | Sills | G06V 40/28 |
| 2020/0026830 | A1* | 1/2020 | Alameh | H04L 63/105 |
| 2020/0309930 | A1* | 10/2020 | Zhou | G01S 15/86 |

(Continued)

OTHER PUBLICATIONS

ZKSoftware, The Advanced Biometric Solution, "iFace302: Zhongkong technology Hybrid biometric verification terminal", Advertisement, 2008, China.

(Continued)

*Primary Examiner* — Nelson S. Giddins
(74) *Attorney, Agent, or Firm* — Venable LLP

(57) ABSTRACT

The present teaching relates to user authentication. Upon a light sensitive sensor detects a motion, an infrared or near infrared sensor may be activated for capturing an image of a body part of a person appearing nearby. The body part may be positioned in a contactless manner with respect to the infrared or near infrared sensor. The image of the body part may be acquired via the infrared or near infrared sensor. Via processing of the image, it may be determined whether the body part being imaged represents an anticipated body part for authentication. If the body part being imaged is determined to be an anticipated body part for authentication, biometric features of the body part may be extracted from the image. Via the extracted biometric features of the body part, it may be verified whether the person corresponds to one of one or more authorized users previously registered.

35 Claims, 10 Drawing Sheets

(56) References Cited

U.S. PATENT DOCUMENTS

| | | | |
|---|---|---|---|
| 2021/0192187 A1* | 6/2021 | Kim | G06T 7/50 |
| 2021/0295010 A1* | 9/2021 | Ross | G06V 40/63 |
| 2022/0172505 A1* | 6/2022 | Bergqvist | H04L 9/3231 |
| 2022/0342972 A1* | 10/2022 | Van Os | G06V 40/172 |
| 2023/0047264 A1* | 2/2023 | Hama | G06F 21/84 |

OTHER PUBLICATIONS

A&S China, Magazine, Front Cover, Apr. 2010, No. 138, China, <www.asmag.com.cn>.

ZKSoftware. The Advanced Biometric Solution, "iFace302: Zhongkong technology Hybrid biometric verification terminal", Advertisement, 2009, China.

A & S China, Magazine, Front Cover, Dec. 2009, No. 131, China, <www.asmag.com.cn>.

* cited by examiner

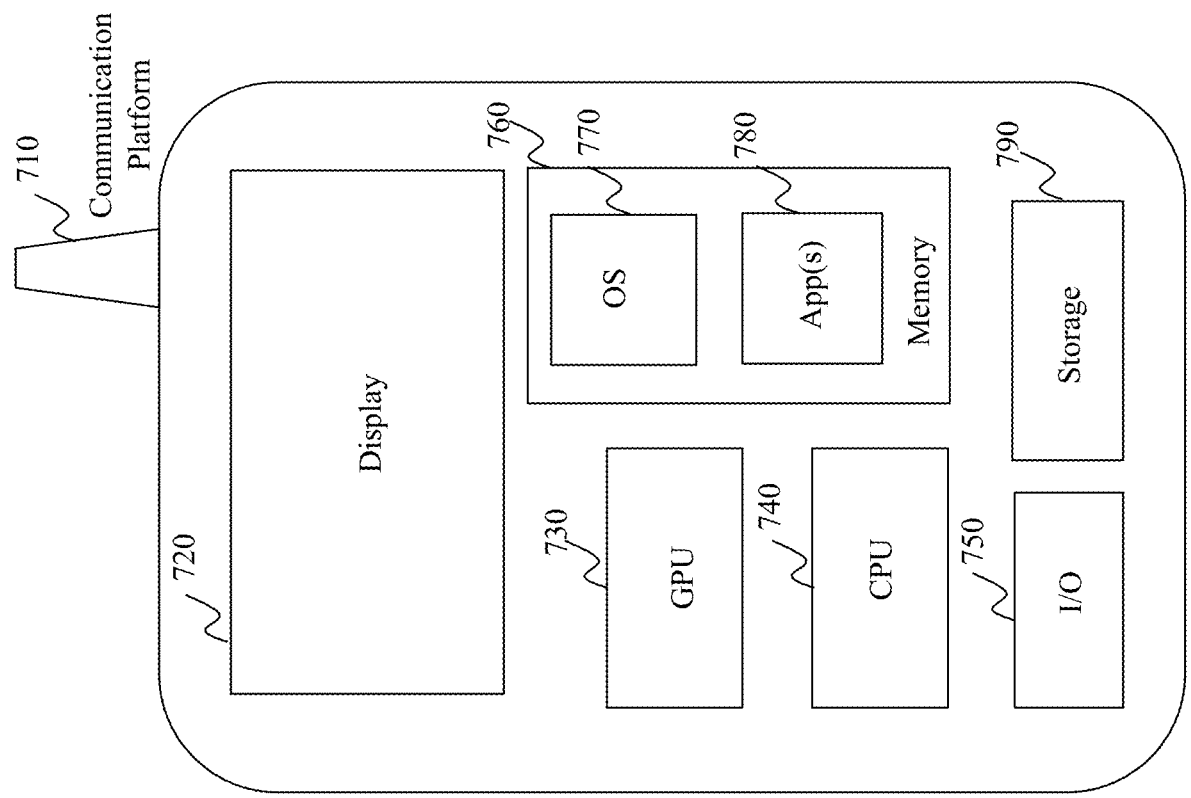

SYSTEM AND METHOD FOR BIOMETRIC AUTHENTICATION

CROSS-REFERENCE TO RELATED APPLICATIONS

This application claims priority to U.S. provisional application No. 63/045,506, filed Jun. 29, 2020, the contents of which are incorporated herein by reference in its entirety.

BACKGROUND

1. Technical Field

The present teaching generally relates to authentication. More specifically, the present teaching relates to biometric authentication.

2. Technical Background

In today's society, access control has become increasingly important to provide security to physical and/or virtual spaces (e.g., bank buildings, private houses, cars, online bank accounts, etc.). Such security is ensured by requiring certain security measures such as satisfactory authentication of users who desire to access such physical and/or virtual spaces. Examples of authentication means include password verification as well as the increasingly popular biometric based means.

Biometric authentication may verify identities of individuals based on unique features (e.g., biometric features, non-biometric features, etc.) associated with the individuals. Individuals whose identities are verified may be granted access to the physical and/or virtual spaces. For example, an individual requesting access to a space with security requirement may be required to provide his/her fingerprint(s) (e.g., asking the individual to press finger(s) on a fingerprint scanner). If the individual's fingerprint(s) matches fingerprint(s) of a registered user, access may be granted; otherwise, access may be denied. Such fingerprint-based access control has been used for several decades and usually requires physical contact between the individual and a user authentication device (e.g., the individual pressing his/her figure(s) on the fingerprint scanner). This limits the throughput because the device has to be informed of presence of the user before the device enters a mode of operation to acquire the fingerprint images and then authenticate.

In addition, authenticating a user based on only fingerprint means may also present other issues. For example, fingerprint-based authentication may be sensitive to exterior environments that impact quality of acquired fingerprint images, such as deposit or smear on the fingers or on the device interface where the fingers are pressing. Furthermore, techniques exist that can be used to forge fingerprints, which can cause security threat if the authentication relies on fingerprint only. Thus, there is a need for methods and systems that address such limitations.

SUMMARY

The teachings disclosed herein relate to methods, systems, and programming for user authentication based on biometric features. More particularly, the present teaching relates to methods, systems, and programming related to authenticating users based on users' biometric features, such as features related to palms, faces and/or other body parts, in a contactless manner.

In one example, a method, implemented on a machine having at least one processor and a communication platform capable of connecting to a network for user authentication is disclosed. A method for user authentication may comprise steps of: detecting a motion via a light sensitive sensor within a field of view of the light sensitive sensor; activating, upon detecting of the motion, an infrared or near infrared sensor for capturing an image of a body part of a person appearing nearby; acquiring, via the infrared or near infrared sensor, the image of the body part of the person positioned in a contactless manner with respect to the infrared or near infrared sensor; determining, via processing of the image, whether the body part being imaged represents one of a plurality of anticipated body parts for authentication; extracting biometric features of the body part from the image if the body part being imaged is determined to be one of the plurality of anticipated body parts for authentication; and verifying, via the extracted biometric features of the body part, whether the person corresponds to one of one or more authorized users previously registered.

In some embodiments, a method for user authentication may comprise steps of: activating an infrared or near infrared sensor for capturing an image of a body part of an authorized user; acquiring, via the infrared or near infrared sensor, one or more images of the body part of the authorized user in a contactless manner; determining, via processing of the one or more images, whether the body part being imaged represents one of a plurality of anticipated body parts; extracting biometric features of the body part from the one or more images, if the body part corresponds to one of the plurality of anticipated body parts; generating, based on the biometric features of the body part extracted from the one or more images, a biometric representation of the anticipated body part of the authorized user; and storing the biometric representation of the anticipated body part of the authorized user.

In a different example, the present teaching discloses a system for user authentication. A system for user authentication may comprise a light sensitive sensor configured for detecting a motion within a field of view of the light sensitive sensor; an infrared or near infrared sensor configured for: acquiring an image of a body part of a person appearing nearby positioned in a contactless manner with respect to the infrared or near infrared sensor; and a computing device configured for: activating, upon detecting of the motion, the infrared or near infrared sensor for acquiring the image of the body part of the person appearing nearby; determining, via processing of the image, whether the body part being imaged represents one of a plurality of anticipated body parts for authentication; extracting biometric features of the body part from the image if the body part being imaged is determined to be one of the plurality of anticipated body parts for authentication; and verifying, via the extracted biometric features of the body part, whether the person corresponds to one of one or more authorized users previously registered.

In some embodiments, a system for user authentication may comprise: an infrared or near infrared sensor configured for: acquiring one or more images of a body part of an authorized user in a contactless manner; and a computing device configured for: activating the infrared or near infrared sensor for acquiring the one or more images of the body part of the authorized user; determining, via processing of the one or more images, whether the body part being imaged represents one of a plurality of anticipated body parts; extracting biometric features of the body part from the one or more images, if the body part corresponds to one of the plurality of anticipated body parts; generating, based on the biometric features of the body part extracted from the one or more images, a biometric representation of the anticipated body part of the authorized user; and storing the biometric representation of the anticipated body part of the authorized user.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having information recorded thereon for user authentication. When the information is accessed by the machine, it causes the machine to perform a series of steps. The series of steps may include activating an infrared or near infrared sensor for capturing an image of a body part of an authorized user; acquiring, via the infrared or near infrared sensor, one or more images of the body part of the authorized user in a contactless manner; determining, via processing of the one or more images, whether the body part being imaged represents one of a plurality of anticipated body parts; extracting biometric features of the body part from the one or more images, if the body part corresponds to one of the plurality of anticipated body parts; generating, based on the biometric features of the body part extracted from the one or more images, a biometric representation of the anticipated body part of the authorized user; and storing the biometric representation of the anticipated body part of the authorized user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is an illustrative diagram of an exemplary mobile device architecture that may be used to realize a specialized system implementing the present teaching in accordance with various embodiments.

DETAILED DESCRIPTION

Figure 1B:
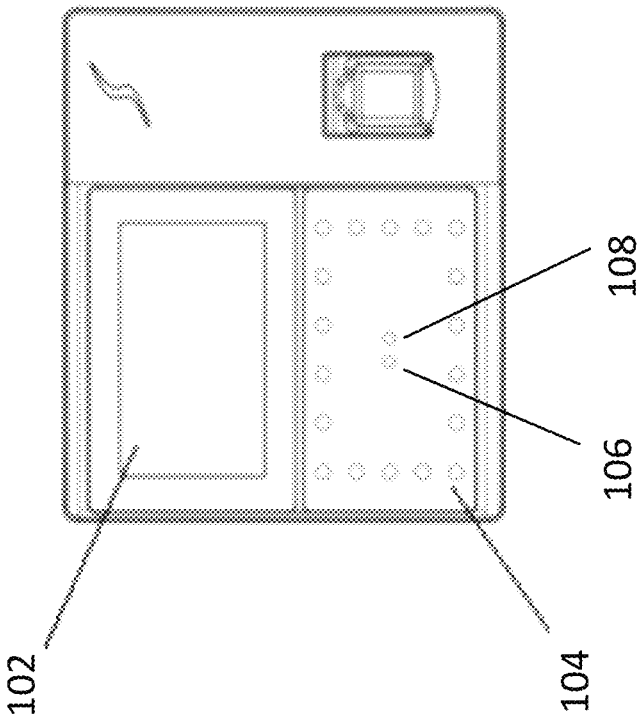
FIG. 1B an exemplary scenario in which a palm of a user is acquired via contactless image acquisition, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional biometric authentication approach that not only requires physical contact between a user and a user authentication device but also uses biometric features that may be easily forged such as fingerprints. The present teaching discloses an authentication device (or a verification device, or a recognition device) that may register users who have the right to access certain spaces and/or verify whether an individual claiming to be a registered user is indeed the registered user. User registration and verification may be done in a contactless manner and based on biometric features of a user's choice, making it more secure and harder to forge (e.g., features related to human faces, features related to human palms, etc.).

For example, the authentication device may have an image acquisition module to acquire one or more images of a person's face and/or palm in a contactless manner (e.g., acquiring the images without requiring the person physically contact the authentication device) and analyze the acquired images to extract biometric features of the person's face and/or palm. The images may include biometric characteristics of the face and/or palm, which may include both visual features that are visible from surface of a palm and internal anatomical features of a person such as venous patterns. In a registration mode, the authentication device may register users who have the right to access the certain space and generate user profiles for the registered users based on biometric features extracted from images of users' faces and/or palms. In a verification mode, the authentication device may determine whether the individual claiming to be a registered user is indeed a registered user by comparing the biometric features extracted from images associated with the individual to biometric information included in user profiles of the registered users. If a match is found, the authentication device may determine that the individual is a registered user. If no match is found, the authentication device may determine that the individual is not a registered user.

There are two stages of operation. The first stage is a registration stage during which the biometric characteristics of each of the users to be authenticated using the device in accordance with the present teaching are to be registered and stored for authentication or verification purposes. Such stored biometric characteristics of a designated group of users may be stored locally in the device in some embodiments, or remotely at a server or even in the cloud in different embodiments. Such stored biometric characteristics may serve as the basis for authenticating any of the designated users in the group. The second stage of the operation is carried out after the device is deployed at a point to access a space and used to authenticate a user. During the second stage, the biometric information of a user who desires to access the space is acquired by the device and the biometric information as acquired is analyzed to extract the biometric characteristics. Such extracted biometric characteristics are then compared with that stored for the group of designated users who are authorized to access the space to determine whether the user has right to enter the space.

To facilitate both registration and authentication operations, image acquisition means is developed according to the present teaching to allow contactless biometric information acquisition. FIG. 1A shows an exemplary structure of an authentication device 100, in accordance with an embodiment of the present teaching. The authentication device 100 may include an image acquisition module; an output device such as a display 102 and/or a speaker; a communication interface capable of connecting to a network to send or receive information associated with the user authentication; and/or other components (e.g., an input device receiving user input). The image acquisition module may include a light source 104; a visible light image sensor 106; an infrared or near infrared light image sensor 108; and a computing device (similar to a computing device 200 in FIG. 2) that may operate to carry out user authentication by controlling operations of one or more of other components, receiving data from one or more of other components and analyzing received data, and/or other functions that may be used in user authentication.

The light source 104 may include one or more of visible light source(s) and one or more near infrared or infrared light source(s). For example, the light source 104 may include one or more LED fill light sources. In case that the light source 104 includes one or more infrared light source(s), one or more 850 nm LED may be adopted as an example.

The visible light image sensor 106 may include a CMOS image sensor (such as a visible light camera) used for visible light image acquisition. The visible light image acquisition may be applied to detect any movement in real time within the field of view of the visible light image sensor. For example, the visible light image sensor 106 may detect changes of visible light in real time to determine whether an object appears in the surroundings of the authentication device 100. The visible light image sensor 106 may include a single image sensor or multiple image sensors.

The infrared or near infrared light image sensor 108 may include a CMOS image sensor (as an infrared or near infrared light camera) used for infrared or near infrared image acquisition. The infrared or near infrared image acquisition may be applied for acquiring images of faces, images of palms (palmprints, palm blood veins, etc.), and/or images of any other body parts. For example, the infrared or near infrared light image sensor 108 may capture images illustrating venous blood vessel patterns of body parts (e.g., human faces, palms). The infrared or near infrared light image sensor 108 may include a single image sensor or multiple image sensors.

As disclosed herein, the image acquisition module is applicable in operations of both registration and authentication stages. In the authentication stage, the authentication device 100 may detect movements in its surroundings. In such a setting, it may be assumed that a detected movement may be caused by a presence of a user. Thus, when a movement is detected, the authentication device 100 may perform image acquisition (e.g., capturing images of an object making the movement, determining whether the object is a face or a palm, extracting biometric features of the face and/or the palm from the images) and then user verification (e.g., verifying the individual appearing in front of the device corresponds to a registered user by comparing the biometric features acquired from the individual with the biometric characteristic information included in the user profiles previously registered/stored). Details related to image acquisition, user registration, and user verification will be discussed below in connection with FIGS. 3-6C.

In operation, the authentication device 100 may be set at a particular mode at each different stage (e.g., a user registration mode, or a user verification mode) and may use the display device 102 or the speaker to advise an individual how to operate under each of the corresponding modes. For example, the authentication device 100 may output audio instructions (e.g., by outputting sound via the speaker) or visual instructions (e.g., by displaying text messages via the display device 102) to instruct the individual to show a face and/or to place a palm in front of the authentication device 100 so that the authentication device 100 may acquire images of the face or palm of the individual.

Figure 1A:
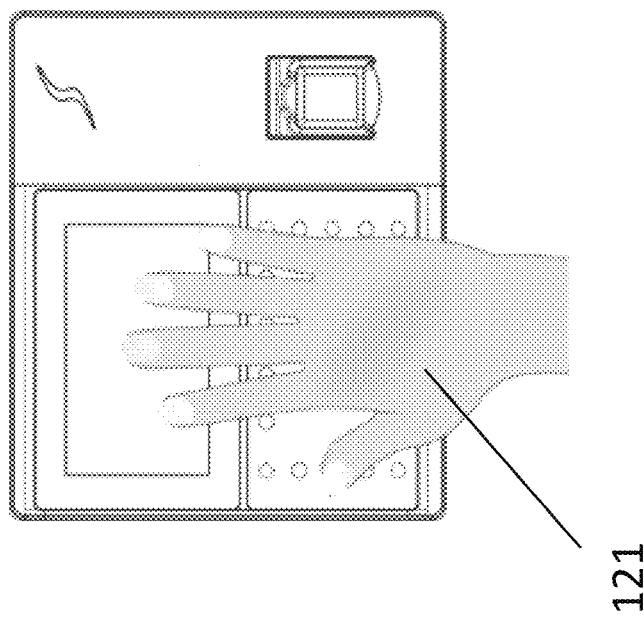
FIG. 1A shows an exemplary structure of an authentication device, in accordance with an embodiment of the present teaching.

FIG. 1B shows an exemplary scenario in which a palm of a user is acquired via contactless image acquisition, in accordance with an embodiment of the present teaching. As shown, an individual may position his/her palm 121 in front of the authentication device 100 in a contactless manner without touching the authentication device 100, the authentication device 100 may acquire an image of the palm 121.

Figure 2:
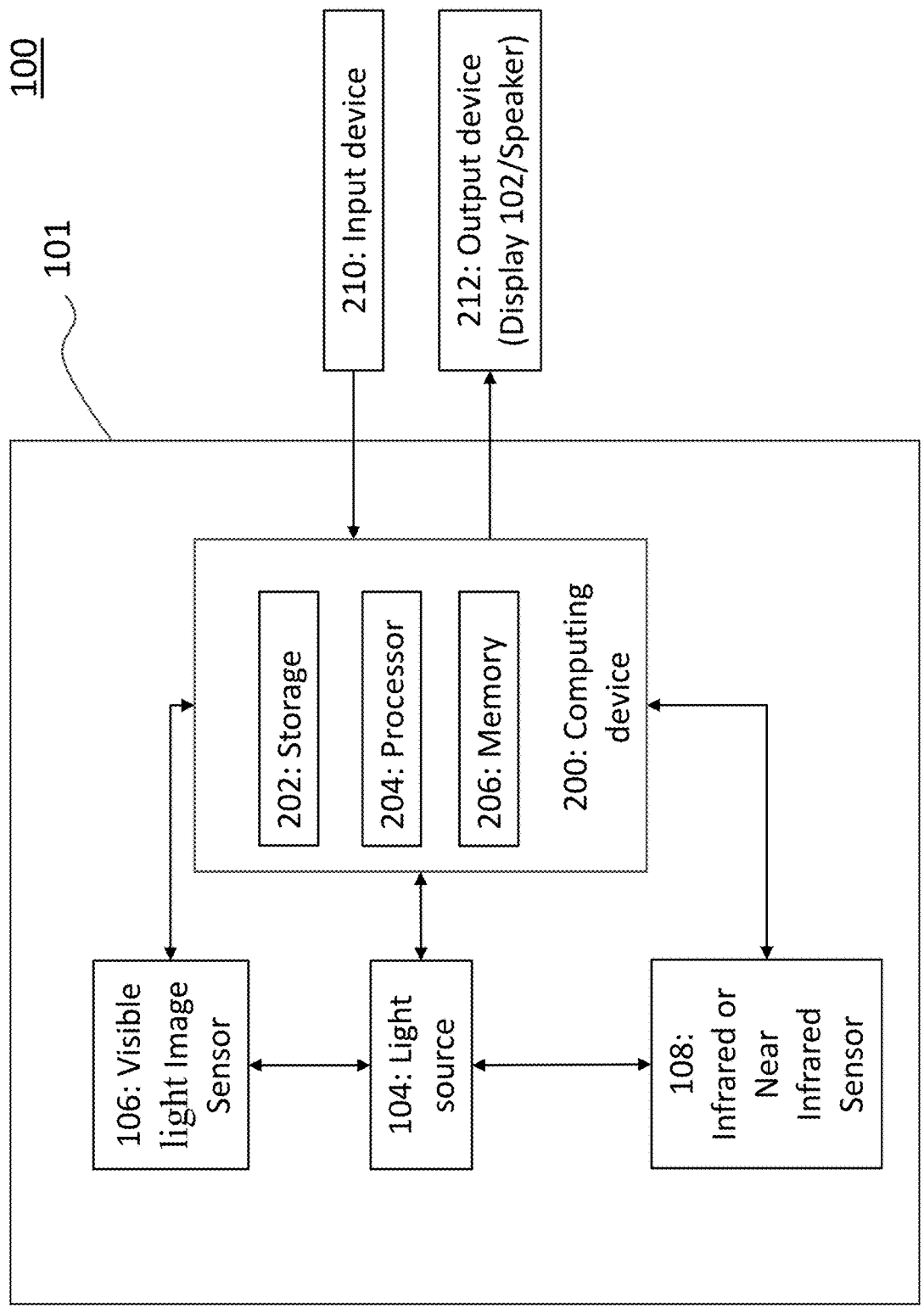
FIG. 2 depicts an exemplary system diagram of an authentication device, in accordance with an embodiment of the present teaching.

FIG. 2 depicts an exemplary system diagram of the authentication device 100, in accordance with an embodiment of the present teaching. The authentication device 100 may include an image acquisition module 101, an output device 212 (e.g., the display 102 and/or a speaker); an input device 210 (e.g., a fingerprint scanner, a card reader, a keyboard, a touchscreen, etc.) receiving user input (e.g., inputting fingerprints, inserting user's access cards, inputting user's name or ID, etc.); and/or other components such as a communication interface capable of connecting to a network to send or receive information associated with the user authentication. The image acquisition module 101 may include the light source 104; the visible light image sensor 106; the infrared or near infrared light image sensor 108; and a computing device 200 that may carry out computations related to user authentication by controlling operations of one or more of other components, receiving data from one or more of other components and analyzing received data, sending data to one or more of other components, and/or any other operations that may be used in or associated with user authentication.

The computing device 200 may include a storage 202, a processor 204, and a memory 206 that work together to realize different functionalities for both registration and authentication operations such as image acquisition, user registration, and/or user verification. In some embodiments, the storage 202 may store data associated with images captured by the visible light image sensor 106 and/or infrared or near infrared light image sensor 108, data associated with analysis results of the captured images, user profiles of the registered users with their biometric characteristics generated during the registration, information associated with identities of the previously registered users, and/or any other additional information that may be associated with or used in image acquisition, user registration, and/or user verification. The memory 206 may also store program instructions, which may, when accessed by the processor 204 may cause the computing device 200 to control operations of one or more of other components (e.g., activating or deactivating the infrared or near infrared light source, activating or deactivating the infrared or near infrared light image sensor 108, switching the visible light image sensor 106 to video mode or to image capture mode; outputting instructions via the output device 212, and/or other operations of one or more of other components); receive information from other components (e.g., receiving images from the visible light image sensor 106 and/or infrared or near infrared light image sensor 108, receiving user input from the input device 210), analyze the received data to either detect motion or extract biometric included in the received images, send data to other components (e.g., sending instructions to the output 212 for display), and/or perform any other operations that are associated with image acquisition, user registration, and/or user verification.

In some embodiments, the input device 210 may be integrated with the output device 212. For example, the output device 212 and the input device 210 may be integrated as a touch screen that may receive user input and output information for display.

As discussed herein, the process of image acquisition may be contactless. For example, a person (e.g., an individual to be registered or an individual to be authenticated, etc.) may position a palm in front of the authentication device 100 without physically touching any part of the authentication device 100. As another example, the person may walk close to the authentication device 100 with his/her face or palm appearing within the field of view of the infrared or near infrared light image sensor 108 of the authentication device 100 order for the biometric information of the face/palm to be acquired.

In the contactless acquisition operation, the individual may position a face or palm in front of authentication device 100, e.g., substantially parallel to the screen of the display 102 with his/her fingers naturally separated without physically touching authentication device 100. The quality of the face images or palm images may degrade if the distance between the individual and the device 100 is too far away apart or too close. If the distance between the face or palm and the authentication device 100 is too far or too close, it may lead to an unsatisfactory acquisition of the face or palm image. The authentication device 100 may determine whether an image acquired from a face or palm is satisfactory based on certain images features, such as whether the shape of the palm is visible or whether it allows the device to detect the face of the individual. For example, the authentication device 100 may determine whether the structure of the veins shown on the image is clear enough to extract the needed biometric characteristics. If the structure of the veins shown on the acquired image is not clear enough to extract the needed biometric characteristics, the image is unsatisfactory and the image acquisition is not successful. If the image acquired does not allow the device to assess whether the acquisition is satisfactory, the image acquisition is not successful.

To ensure proper image acquisition, the authentication device 100 may define a confining box within which the face or palm should appear for proper image acquisition, and display the confining box on the screen of the display 102 to provide guidance. The authentication device 100 may prompt the individual to position in such a way that the face or palm of the individual appears within the confining box on the screen of the display 102. For example, the display 102 may display a text message, e.g., "Please adjust the center of your palm in the green area and separate your fingers naturally," "Please adjust the center of your face in the green area," etc. To ensure that the face or palm is within the confining box, a user may move around the face or palm until the face or palm appears within the confining box. In some embodiments, the authentication device 100 may suggest, e.g., via a message on the screen of the display 102, that the distance between the hand and the authentication device 100 should be between a specific range, e.g., between 15 cm and 50 cm. If the authentication device 100 does not detect a face or hand, the authentication device 100 may assume that the face or palm is not in its field of view. In some embodiments, the device 100 may abandon the image acquisition operation and continue to monitor whether a face/palm enters its field of view.

Figure 3:
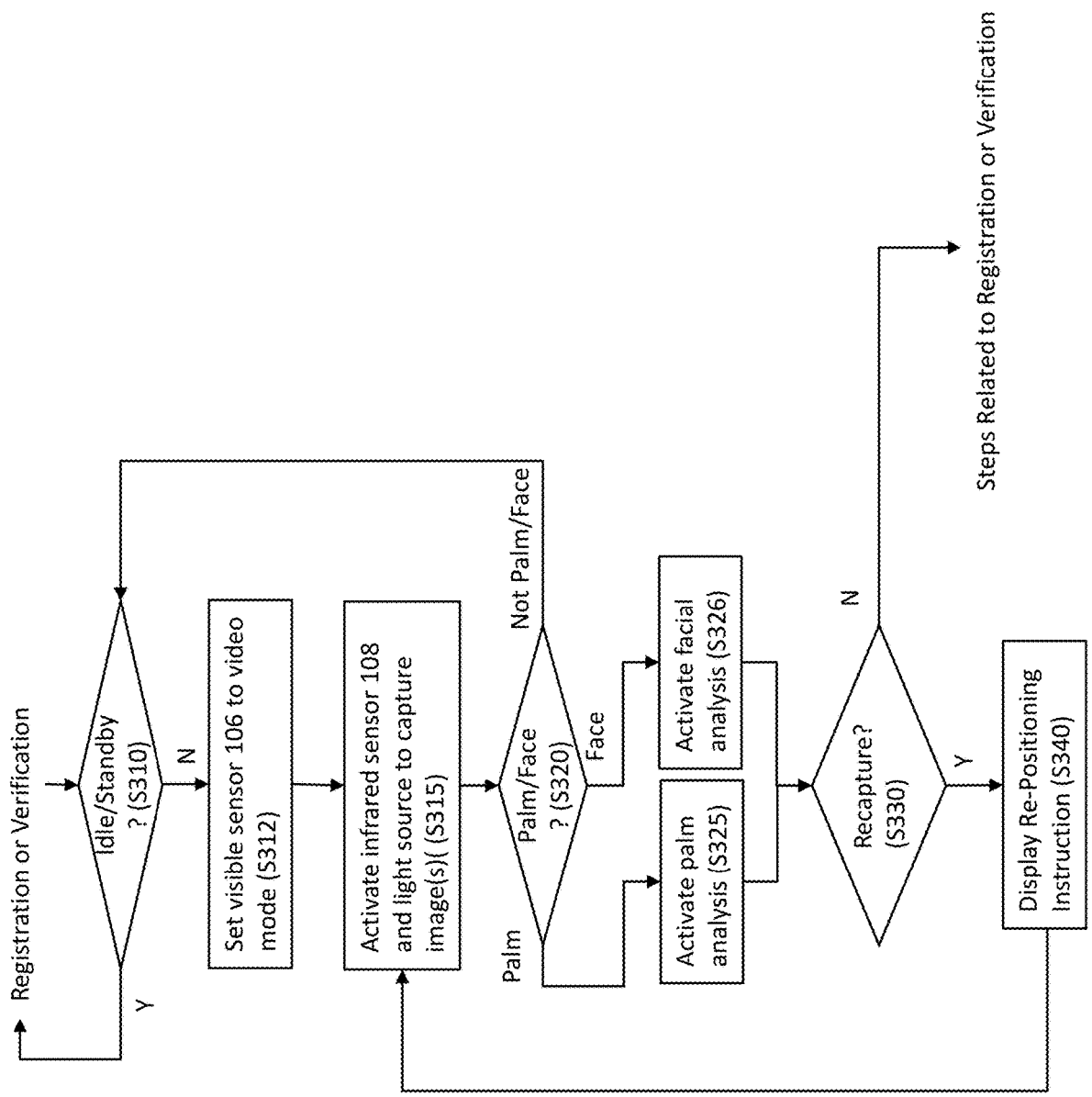
FIG. 3 is a flowchart of an exemplary process of image acquisition, in accordance with an embodiment of the present teaching.

FIG. 3 is a flowchart of an exemplary process of image acquisition, in accordance with an embodiment of the present teaching. As discussed herein, image acquisition occurs in either the registration stage or in the authentication stage. At any operational moment, the device 100 is set to operate in a particular mode (e.g., a registration mode, a verification mode). For example, an operator of the authentication device 100 may input instructions via the input device 210 to instruct the authentication device 100 to initiate a registration mode or a verification mode by, e.g., entering a command via a keyboard to start a registration mode or a verification mode. In some embodiments, the operator may also select, from multiple options presented to the operator, either the registration mode or the verification mode.

As discussed herein, for the authentication device 100 to function as an authentication/verification device, a number of users must be registered first in order to establish the baseline or groundtruth of the biometric characteristics of such users and this is achieved in the registration stage. The authentication mode generally is not set until the registrations of users to be authenticated are completed. In either mode, the image acquisition is performed. In the registration mode, the biometric information of a user authorized to access a space is acquired using the image acquisition module when the user is requested to make his/her face and/or palm visible to the acquisition module.

In the verification mode, the authentication device 100 is deployed outside of the space (e.g., outside of a door though which a user can enter to access the space) to be secured. The authentication device 100 in the authentication mode operates in the following manner. It may continuously monitor, in its field of view, whether there is a movement in its surroundings, accordingly determines whether the detected movement corresponds to a user, and then activates appropriate sensor and imaging components in the device to try to acquire one or more images of a face or a palm of the user.

At step S310, the authentication device 100 may be in an idle or standby state. In the idle or standby state, the infrared or near infrared light source(s) included in the light source 104 and the infrared or near infrared light image sensor 108 may be set inactive (e.g., not in an operating mode, for example, the infrared or near infrared light source(s) not emitting lights and the infrared or near infrared light image sensor 108 not capturing images). In the idle or standby state, the visible light image sensor 106 may be set active to detect movements in real time based on sensed visible light changes. For example, the visible light image sensor 106 may continually capture images of the surroundings (e.g., periodically such as every 200 ms) and compare them with some previously captured images. If the subsequently captured image is substantially the same as the previously captured image(s), it may be determined that there is no movement. If the subsequently captured image(s) is/are different from previously captured image(s), it may be determined that there is a movement.

If no movement is detected, the authentication device 100 may maintain in the idle or standby state and continue to acquire images via the visible light image sensor 106. If a movement is detected, the authentication device 100 exits the idle or standby state and proceeds to step S312. At step S312, the visible light image sensor 106 may be switched to a video mode to capture video (or continuous video information) to record actions of the object making the movement. In some embodiments, the video information may be used to display the object on the display 102. In some embodiments, one or more frames of the video may be analyzed to determine whether what is captured corresponds to a face or a palm (which will be discussed below). In some embodiments, such video information may be stored in a database (a remote database or the storage 202) for future use, e.g., serving as stored evidence when, e.g., a criminal investigation requires a review of such information.

Upon detecting a movement, at step S315, the infrared or near infrared light source(s) and the infrared or near infrared light image sensor 108 may be activated (e.g., in an operating mode, for example, the infrared or near infrared light source(s) emitting lights and the infrared or near infrared light image sensor 108 in a mode of capturing images) to acquire images of the object. The display 102 may display an indication to instruct the individual to position so that the face/palm appears in the confining box, and/or may display the captured video (captured by the visible light sensor 106) of the face/palm on the screen to show what is observed relative to the confining box displayed on the authentication device 100. Showing the relative position between what is observed and the confining box may help the individual to properly adjust his/her position to facilitate acquisition of good quality images.

At step S320, the computing device 200 may analyze the infrared or near infrared images acquired by the infrared or near infrared light image sensor 108 and/or one or more frames of the video captured by the visible light image sensor 106 to determine what is observed, e.g., whether it is a face or a palm (and/or other anticipated body parts that are to be used in user verification). For example, the computing device 200 may analyze the infrared or near infrared images acquired by the infrared or near infrared light image sensor 108 to determine whether the image(s) acquired represents a face or a palm. For example, if it is determined that the infrared or near infrared image(s) represents a face, the computing device 200 may then determine that the object observed corresponds to a face.

In some embodiments, the computing device 200 may make such a determination based on artificial intelligence technique via, e.g., trained models for detecting a face or a palm based on acquired image data. For example, one or more models for detecting a face or a palm may be obtained via machine learning (e.g., deep learning). During the training, training data representing palms images and faces images may be fed to the learning mechanism to create one or more models that may be subsequently used to recognize, based on image data, a face or a palm (or other anticipated body parts that may be used for user authentication). For example, a visible light image model trained based on visible light images may be used to determine whether the one or more frames of the video captured by the visible light image sensor 106 correspond to images with a face or a palm therein. Some infrared or near infrared image model(s) may also be trained and used to recognize a face or a palm based on image data acquired by the infrared or near infrared light image sensor 108. The computing device 200 may analyze frame(s) of the video captured by the visible light image sensor 106 and/or infrared or near infrared images captured by the infrared or near infrared light sensor 108 based on the visible light image model and/or the infrared or near infrared image model to determine what the object is (e.g., a face or palm).

If it is determined that the object observed corresponds to a palm, the process may proceed to step S325 where the program stored in the memory 206 for biometric analysis of a palmprint or palm vein image may be invoked. If it is determined that the object observed is a face, the process may proceed to step S326 where the program stored in the memory 206 for biometric analysis of a face image may be invoked. In some embodiments, other biometric features (e.g., iris, or any other body parts) may be also used in user authentication in addition to or alternatively replacing face and/or palm based verification. In these cases, the step S320 may further determine whether the object is an iris and if so, additional or alternative subsequent steps such as activating iris analysis may be taken.

At step S325, the program stored in the memory 206 for biometric analysis of a palmprint or palm vein image may be invoked. For example, the authentication device 100 may capture infrared or near infrared image(s), analyze the image(s), and extract biometric features from the image(s). The infrared or near infrared light used in this step may have same or different intensity compared to the infrared or near infrared light used in step S312. For example, this step may use infrared or near infrared light having higher intensity to get better quality image(s) for palm feature analysis. The near infrared or infrared light source(s) may be controlled, for example, by the computing device 200 to emit infrared or near infrared light. When the infrared or near infrared light reaches the palm to illuminate internal anatomical structures such as muscle, veins, and bones of the palm, the infrared or near infrared light may be reflected by the palm and the reflected light may be received by the infrared or near infrared light sensor 108. The blood veins in the palm may partially absorb the infrared or near infrared light, and this may enable formation of an image of the venous blood vessel pattern of the palm. Such an image may be projected on the infrared or near infrared light sensor 108 through one or more lens to form an infrared or near infrared image of the venous blood vessel pattern. The captured infrared or near infrared image(s) may be converted into an electrical/data signal and transmitted to the computing device 200, which may then analyze the received infrared or near infrared image of the palm to extract features related to different anatomical structures inside the palm. For example, the computing device 200 may analyze the palm image to extract features such as quantity of veins/bones, shapes of the veins/bones, color of veins/bones, thickness of veins/bones, and/or any other unique features associated with the palm veins shown on the image. As another example, the computing device 200 may analyze the palm image to extract features such as palmprint of the palm. Since palmprint is unique for an individual, palmprint may be used for registration and/or verification.

In some embodiments, the computing device 200 may use and analyze the infrared or near infrared images that are acquired at step S315, and extract features related to the palm and/or face from those images. In these cases, the above-described infrared or near infrared image capture at step S325 may be omitted.

Such features may be extracted during both registration and verification. As discussed herein, the extracted features during registration are used as characteristic or signature information for each user and will be used during the verification stage for authentication. During verification stage, such features are extracted from the person who approached the device and then used to compared with the registered signatures of authorized users so that the person is allowed to access only if the features extracted during verification stage match with the signature of one of the registered and authorized users. Since different individuals may have different venous blood vessel patterns, unique features associated with the venous blood vessel patterns may be used to distinguish different individuals. As such, if the venous blood vessel patterns associated with an individual claiming to be a registered user match the venous blood vessel patterns associated with a registered user, the individual may be indeed the registered user.

As step S326, the program stored in the memory 206 for biometric analysis of a facial image may be invoked if it is determined that the object is a face. Similar to step S325, the computing device 200 may capture new infrared or near infrared facial image(s) or retrieve infrared or near infrared facial image(s) obtained at S315, analyze the facial image (s), and extract unique features (e.g., facial feature positions and spatial relations among such facial features associated with the face, and/or any other features that may be used to distinguish different individuals based on facial features) associated with the face observed by the infrared or near infrared sensors.

Similar to the palm based process described above in step S325, facial features extracted at step S326 may be obtained in both registration and verification stages. Such features extracted in the registration stage are stored in a storage (e.g., the storage 202 and/or a remote database) for subsequent use during the verification stage. Then, during the verification stage, the facial features of a person approaching the device may also be extracted and then used to determine whether the facial features of the person match with that of any of the previously registered authorized users. If a match is found, the person is permitted to access the space. Otherwise, the person is not allowed to access the space. Any facial feature may be used to distinguish different individuals.

In some embodiments, images/videos captured by the visible light sensor 106 may be used to assess the likelihood of acquiring a good quality image. For example, images/videos acquired by the visible light sensor 106 may be analyzed to determine whether the observed object is positioned properly to allow a satisfactory analysis of biometric features associated with the observed object. For instance, the palm image as observed via the visible light sensor 106 may be analyzed to assess whether the palm is positioned properly to allow a satisfactory analysis of the palm features. Specifically, in some embodiments, the outline of the palm as observed may be analyzed so that if the outline of the palm does not fit expected outline of a palm, the palm may not be positioned properly. When it is considered not corresponding to a palm, a further analysis may be performed to assess whether what is observed via the visible light sensor 106 corresponds to a face. An analysis of the image/video may also enable an assessment on whether it is a facial image (e.g., whether there is a region in the image that has a color similar to a known facial color) and if so, whether the image represents a quality facial image to allow satisfactory extraction of biometric characteristics (e.g., if only partial face is visible in the image, it is not satisfactory). As discussed above, such preliminary analysis of visible light sensor images allows the device 100 to determine whether a further analysis of biometric features should be performed.

In some embodiments, the images/videos from the light sensitive sensor 106 may also be alternatively or additionally used to analyze features associated with the face and/or the palm. For example, the computing device 200 may analyze one or more frames of the video captured by the visible light sensor 106 to extract features associated with the shape and/or texture of the palm and/or face for registration and/or verification, because the shape and/or texture of the face or palm is also unique to an individual. Any other features that may be used to distinguish different individuals may be extracted from images/videos captured by the visible light sensor 106, and the extracted features may be alternatively or additionally used for user registration and/or verification. In one example, the features associated with the face and/or the palm, analyzed based on the images/videos captured by the visible light sensor 106, may be combined with the features associated with the face and/or the palm, analyzed based on the images/videos captured by and the infrared or near infrared light image sensor 108, to determine whether the individual observed is a registered user authorized to access. In another example, the features associated with the face and/or the palm, analyzed based on the images/videos captured by the visible light sensor 106, may be independently used to determine whether the individual claiming to be a registered user is a registered user, and in this case, the above-described operations with reference to FIG. 3 and associated with the infrared or near infrared light image sensor 108, may be similarly applied to the visible light sensor 106, and the near infrared or infrared light source(s) does not need to be activated.

In some embodiments, the infrared or near infrared light source(s) and the infrared or near infrared light image sensor 108 may be deactivated after the palm analysis and/or facial analysis is completed in step S325 or S326.

In step S325 and/or S326, image processing may be applied to the acquired facial/palm image(s) (either visible light images or infrared or near infrared images) to analyze and extract facial/palm features that can be used for registration and/or verification.

At step S330, the computing device 200 may determine whether the quality of an acquired image is satisfactory to allow properly extracting biometric features from an image, and whether recapture is required. For example, if a face or a palm is positioned too far away from the authentication device 100, an infrared or near infrared image of the face or a palm cannot capture sufficient details of biometric features, such that the computing device 200 is unable to extract sufficient biometric features from such images. The computing device 200 may determine that the acquired image is unsatisfactory to allow properly extracting biometric features from an image, and recapture is required.

In some embodiments, as discussed herein, images/videos acquired by the visible light sensor 106 may be used to determine whether recapture is required. If there are issues occurring during image capture (e.g., poor lighting, poor capturing angle, poor capturing position, etc.), the authentication device 100 may be unable to properly extract biometric features from the image. As a result, the authentication device 100 may determine that the image was not properly captured and the image capture was a failure. In this situation, the authentication device 100 may prompt to re-capture the image by displaying an instruction to instruct the individual to reposition the face/palm, and/or may present some tips to the individual (e.g., displaying a message such as "relaxing your figures", etc.) for helping get a good quality image. In these cases, an order of step S330 may be altered. For example, step S330 may performed after step S312 wherein images/videos are acquired by the visible light sensor 106 and before the step S315 where the infrared or near infrared sensor 108 is activated. If the order of step S330 changes, orders of step(s) following step S330 (e.g., S340) should be adjusted accordingly.

In some embodiments, when the image acquisition is not satisfactory (e.g., the palm or face is not completely observed), the authentication device 100 may instruct a user to reposition so that either a palm or a face will appear in a target region (e.g., the confining box as displayed) within a proper distance range on the interface. If it is determined that the quality of image is satisfactory for extracting biometric features from the image(s), image recapture is not required and the process may proceed to subsequent steps related to registration or verification which will be discussed below.

If it is determined that the quality of image is not sufficient for extracting biometric features from the image(s), image recapture is required and the process may proceed to step S340 where the authentication device 100 may display an instruction via the output 212 (e.g., displaying a visual instruction via the display 102, outputting an audio instruction via the speaker, etc.) to instruct the individual to adjust the position relative to the authentication device 100. The process then goes back to step S315 to activate the infrared or near infrared light sensor 108 and the infrared or near infrared light source for recapturing the image.

Figure 4:
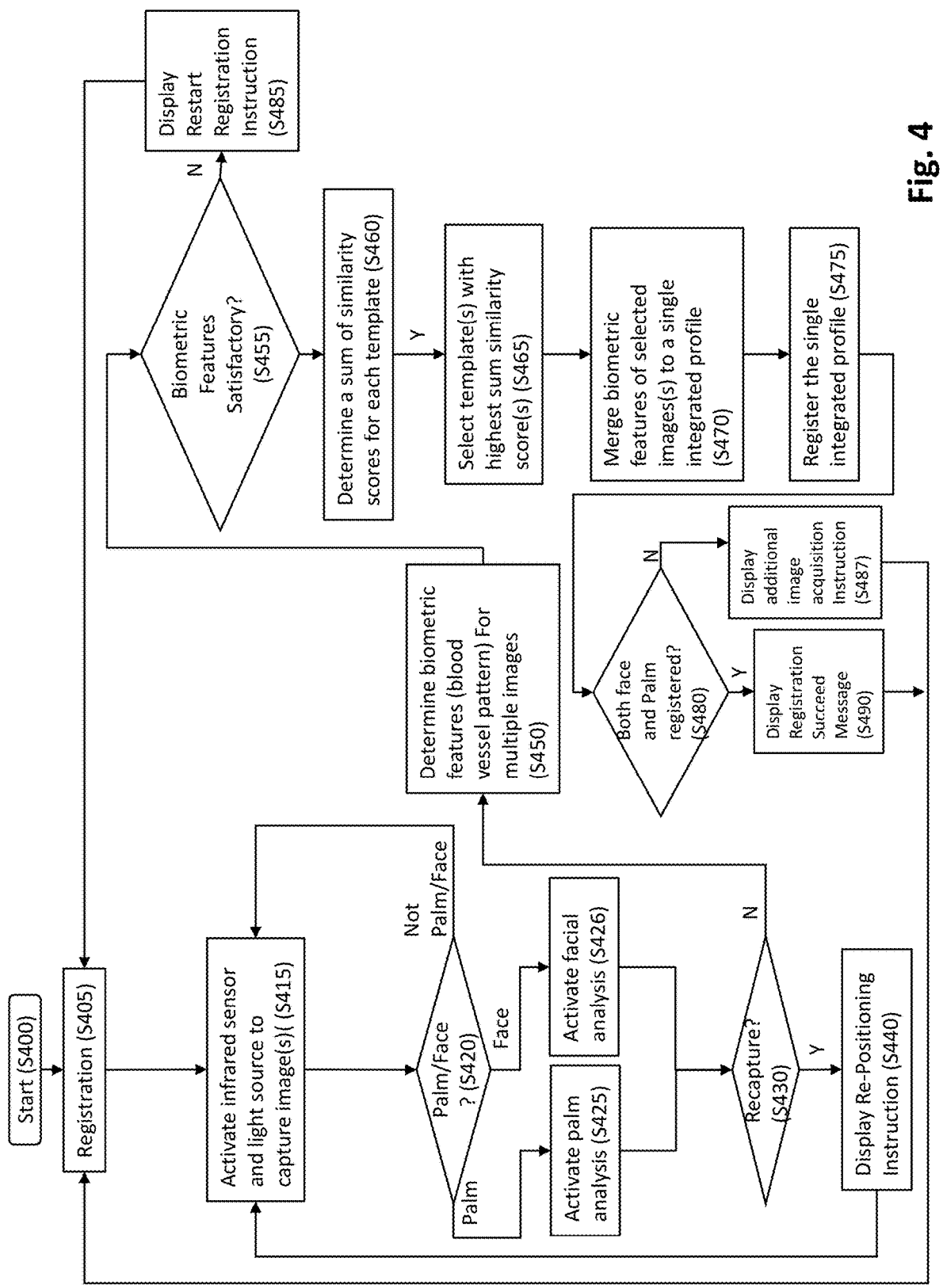
FIG. 4 is a flowchart of an exemplary process of registration, in accordance with an embodiment of the present teaching, in accordance with an embodiment of the present teaching.

FIG. 4 is a flowchart of an exemplary process of registration, in accordance with an embodiment of the present teaching. In some embodiments, the authentication device 100 may use biometric features associated with only one of the palm and the face to register the user. In some embodiments, the authentication device 100 may use biometric features associated with both of the palm and the face to register the user. In some embodiments, any biometric features in addition to face/palm may also be used. Examples of such biometric features include iris, finger vein, etc. The discussion herein directed to facial features and palm features for authentication purposes are not provided as limitations but merely illustration and do not limit the scope of the present teaching.

FIG. 4 shows an exemplary process of registering both of the palm and face for the user. The process may start from step S400. At step S405, the authentication device 100 may be set at a registration mode in which a user authorized to access a certain space is to be registered. The authentication device 100 may output audio or visual instructions to instruct the user to position his/her face or palm in front of the device for registration. For example, the authentication device 100 may output an audio message of "Please step forward and position your face or palm in front of me."

In some embodiments, when the authentication device 100 is set at the registration mode, the authentication device 100 may request non-biometric information associated with the user, such as user's name and/or ID. Biometric features associated with the user that will be obtained in the following steps may be associated with such non-biometric information to complete the registration. In some embodiments, the authentication device 100 may not request such non-biometric information and may simply register the user based on the biometric features.

The process of registration may utilize some or all of the steps of the image acquisition workflow shown in FIG. 3. At step S415 (similar to step S315), the infrared or near infrared light source(s) and the infrared or near infrared light image sensor 108 may be activated to acquire image(s) of the body part provided by the user. At step S420 (similar to step S320), the computing device 200 may employ a program, developed based on artificial intelligence techniques, to determine what body part the user has provided for registration, e.g., determining whether the provided body part is a face or a palm. At step S425 (similar to step S325), if it is determined that the user has provided a palm for registration, the program stored in the memory 206 for biometric analysis of a palmprint or palm vein image may be invoked, and biometric features of the palm may be extracted from the acquired infrared or near infrared images, and these extracted biometric features may then be registration as biometric representation of the user. At step S426 (similar to step S326), if it is determined that the user provides a face for registration, the program stored in the memory 206 for biometric analysis of a face image may be invoked, and biometric features of the face may be extracted from the acquired infrared or near infrared images, and these extracted biometric features may be used for registration. If it is determined that the image of what the user presented does not correspond to an anticipated body part (in this example, the anticipated body part being a face or a palm), the process may go back to step S410 to continue to wait for the user to provide an anticipated body part for registration.

Although a face and a palm are illustrated herein as anticipated body parts, it is not a limitation to the scope of the present teaching. Other body parts may also serve as the basis for acquiring the biometric information of a user during registration for the purpose of subsequent authentication of the user in access control.

At step S430 (similar to step S330), the computing device 200 may determine whether the quality of an acquired infrared or near infrared image is satisfactory for properly extracting sufficient features from an image. If the quality is unsatisfactory, recapture may be required and the process may proceed to step S440 where the authentication device 100 may output a re-positioning instruction via the output 212.

In some embodiments, the authentication device 100 may use biometric features extracted from a single image of the palm or face to register the palm or face of the user. In these cases, the authentication device 100 may generate a user profile for each user based on the biometric features extracted from a single image of the palm and/or a single image of face.

In some embodiments, to improve robustness, for registering biometric features of one body part (e.g., face or palm) of each user, multiple images may be acquired and biometric features extracted from one or more most reliable images of the multiple images may be selected for registration. For example, a set of biometric features may be extracted from each of the multiple images. As such, for registering one body part of the user, multiple sets of biometric features may be extracted from multiple images. Part or all of the extracted multiple sets of biometric features may be integrated to create a single set of biometric features. The single set of biometric features may be a registered biometric profile for the user. For example, when registering the facial biometric information for the user, the authentication device 100 may capture multiple images representing facial properties of the user in different angles, extract biometric features from one or more images of the multiple images of the face, and integrate the extracted biometric features into an integrated facial profile of the user as a registration representing the user. Registration based on palm biometric information may operate in a similar way, and an integrated palm profile of the user may be generated as another registration representing the user. That is, there may be one integrated biometric feature profile registered for each body part of each user. Each user may be associated with to one or more integrated biometric feature profiles each corresponding to a respective mode (e.g., a respective body part). Details of determining an integrated biometric feature profile based on multiple images will be described in connection with below steps S450, S455, S460, S465, S470, and S475.

If the quality of the acquired image(s) is satisfactory, the process may proceed to step S450. At step S450, for each body part, the authentication device 100 may determine a set of biometric features (e.g., blood vessel pattern, and/or other biometric features) for each image to generate a template with extracted biometric features extracted to represent the user. In this case, for each body part, multiple templates may be generated based on the multiple sets of biometric features extracted from the multiple images.

At step S455, the authentication device 100 may determine whether the biometric features extracted from the images are satisfactory. For example, the authentication device 100 may determine a set of biometric features for each image with a confidence score (e.g., a score indicating whether the biometric features indeed correspond to the anticipated body part, e.g., a palm or face). Low confidence score may be due to various reasons such as dark image, error in image acquisition such as a palm image not corresponding to a palm, etc. The authentication device 100 may determine whether at least one set of biometric features exceeds a confidence threshold (e.g., 90%, or any other suitable value). If the confidence scores of all sets of the biometric features from all the multiple images are below the confidence threshold, the authentication device 100 may determine that all the extracted biometric features are not satisfactory for registration, and this registration is invalid. The process may then proceed to step S485 where an indication of restarting the registration may be displayed on the screen. For example, the indication may be a text message of "Registration failed, registration restarts. Please place your palm in the green area." The process then goes back to S405 to confirm if the model of the authentication device is still registration mode, and if so, the registration process is restarted.

If the confidence score of at least one set of biometric features exceeds the confidence threshold, the authentication device 100 may determine that at least one set of the extracted biometric features is satisfactory for registration, and the process may proceed to step S460. In some embodiments, the authentication device 100 may require more than two sets of biometric features be satisfactory for registration to continue registration. In some embodiments, the determination on whether an acquired image yields a template with a satisfactory confidence score may be made sequentially, i.e., one at a time after the image is processed and before acquiring the next image.

Step S455 may improve accuracy of registration by confirming that the biometric features are accurately extracted from high quality image(s). In some embodiments, step S455 may be omitted. One or more most reliable templates may be selected from the multiple templates for registration. For example, at steps S460 and S465, one or more templates having highest sum similarity scores may be selected for registration.

At step S460, a sum of similarity scores for each template of the multiple templates may be determined. For example, a first template of the multiple templates may be compared to each of other templates of the multiple templates, and a similarity score representing similarity between the first template and each of other templates may be computed. As such, the first template may be associated with multiple similarity scores with respect to other templates. An overall similarity score for the first template may be computed, e.g., a sum of similarity scores between the first template and other individual templates. For instance, if there are 4 templates (e.g., 4 images were acquired for one body part (palm or face)), for template 1, its overall similarity score is a sum of similarity scores between templates 1 and 2, 1 and 3, and 1 and 4. Such an overall score represents the similarity between template 1 and all other templates (templates 2, 3, and 4). Such an overall similar score may be determined for each of the multiple templates. At step S465, all of the overall similarity scores of all the multiple templates may be ranked, e.g., from most similar to the least. Among the multiple templates, one or more of templates having the highest overall similarity score(s) may be selected.

As step S470, biometric features indicated by the selected template(s) may be merged to generate a single merged template representing the user's biometric representation of one body part (face or palm). In some examples, if biometric features of one selected template do not overlap with biometric features of any other selected template(s), all of the biometric features of the one template may be included in the single merged template. In some other examples, if one or more biometric features of a selected template overlap with one or more biometric features of another selected template, the single merged template may only include the overlapped biometric features once such that the single merged template does not include duplicate biometric features. Still in some other embodiments, the single merged template may include average values of biometric features included in the selected images.

At step 475, the single merged template may be registered in the authentication device 100 as an authentication criterion (e.g., an integrated biometric feature profile) for the user. The integrated biometric feature profile may be included in the user profile associated with the user. At step S480, it is determined that whether both face and palm has been registered as authentication criteria for the user. If not, the process may proceed to step S487 where the display 102 may display an instruction to instruct the user to place face or palm that has not been registered in front of the authentication device 100 for additional image acquisition.

The process may then go back to step S405 to confirm that the authentication device 100 is still in the registration mode, and if so, the registration may continue to register face or palm that has not been registered for the user. Alternatively, the process may go back to step S415 to continue the registration by acquiring infrared or near infrared images of a face or palm that has not been registered for the user.

In this example, the user profile may include multiple integrated biometric feature profiles each corresponding to a respective body part (e.g., face or palm) and each used for verifying an individual based on the respective body part. In some embodiments, the user profile may include a single integrated biometric feature profile corresponding to a single body part.

In some embodiments, the authentication device 100 may combine the integrated biometric feature profile associated with face (e.g., facial profile) and the integrated biometric feature profile associated with palm (e.g., palm profile) into a single biometric feature profile, and may include this single biometric feature profile into the user profile of the individual.

In some embodiments, the progress of the registration may overwrite the change of mode. For example, if it is determined the mode has been changed to verification but registration of face is yet to be completed, the authentication device 100 may continue to register the face regardless the change of mode. In some embodiments, the progress of the registration does not need to overwrite the change of mode. For example, if it is determined that registration of face is yet to be completed but the mode has been changed to verification, the authentication device 100 may terminate registration process and switch to the verification mode. The authentication device 100 may resume face registration for the user in the future when the authentication device 100 is set at registration mode and the user provides the face for registration.

If it is determined that both face and palm have been registered for the individual, the process may proceed to step S490 to display an indication on the display 102 to indicate that the registration for the user is completed successfully.

In some embodiments, after a biometric feature profile or an integrated biometric feature profile is registered, the infrared or near infrared light sensor 108 and the infrared or near infrared light source may be deactivated. As such, the authentication device 100 may be ready for the next round of image acquisition for registration or verification.

As such, by the process of FIG. 4, the authentication device 100 may register both face and palm for a user based on biometric features extracted from multiple acquired images of the face and multiple acquired images of palm. Alternatively or in addition, the authentication device 100 may be used for registering only face or palm. Alternatively or in addition, the authentication device 100 may be used for registering face, palm and additional body parts such as iris.

In some embodiments, the authentication device 100 may additionally use the visible light image sensor 106 in registration. For example, after step S405 and before step S415, the visible light image sensor 106 may be activated to periodically capture images of the surrounding to detect a movement. If the user approaches the authentication device 100 and places a body part (e.g., a face or a palm) in front of the authentication device 100 for registration, the visible light image sensor 106 may detect a movement of the user and observe the body part. The visible light image sensor 106 may then be switched to video mode to capture continuous video information to record movements of the body part. As discussed previously, the visible light image/video captured by the visible light sensor 106 may be used to display the user's body part on the display 102, determine what body part the user has provided for registration, and/or determine biometric features of the body part.

Figure 5A:
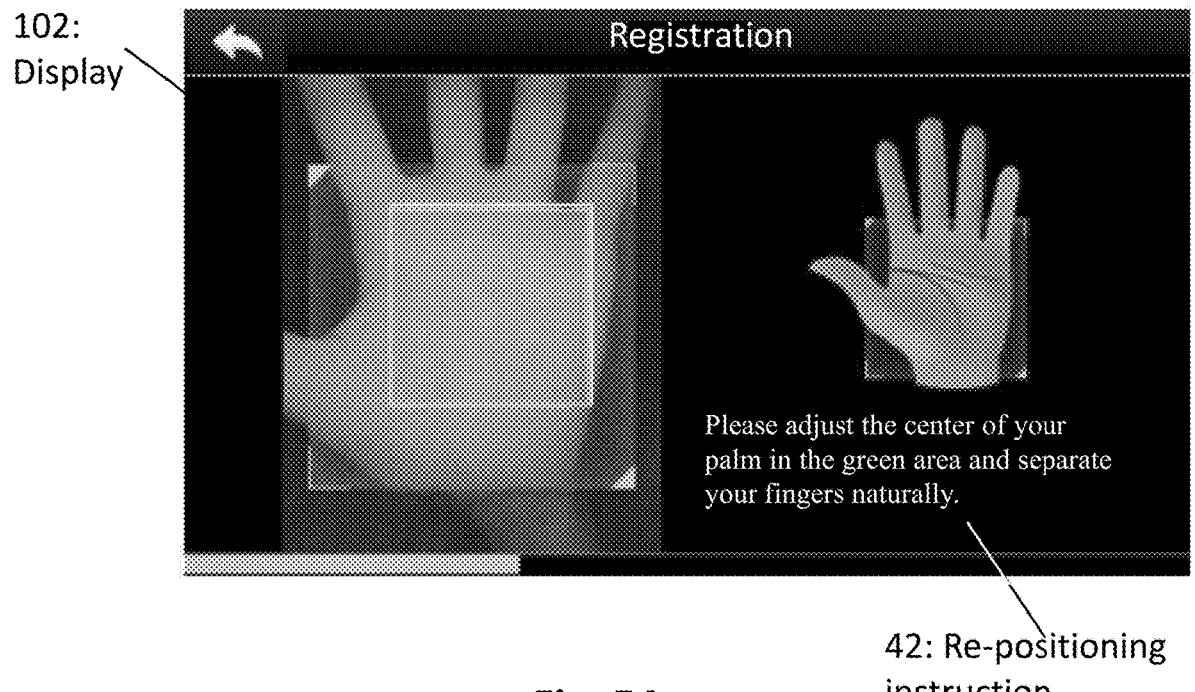
FIG. 5A shows an exemplary a re-positioning instruction, in accordance with an embodiment of the present teaching.

FIG. 5A shows an exemplary a re-positioning instruction, in accordance with an embodiment of the present teaching. FIG. 5A shows a screen shot of the display 102. On the left side of FIG. 5A, the display 102 may display image/video captured by the visible light sensor 106 to show a real relative position between the palm and the authentication device 100. On the right side of FIG. 5A, the display 102 may display a reference relative position between a reference palm and the authentication device 100 to show where a palm should be positioned to get a satisfactory image. As shown in the reference relative position, the reference palm is positioned at the center of a green confining area. A re-positioning instruction (and/or a tip) 42 may be displayed on the screen. For example, the re-positioning instruction 42 may be "Please adjust the center of your palm in the green area and separate your finger naturally." The user may compare the real relative position between the user's palm and the authentication device 100 (shown on the left side of the screen shot) with the reference relative position (shown on the right side of the screen shot), and may move around the palm to allow the real relative position to be close to the reference relative position.

Figure 5B:
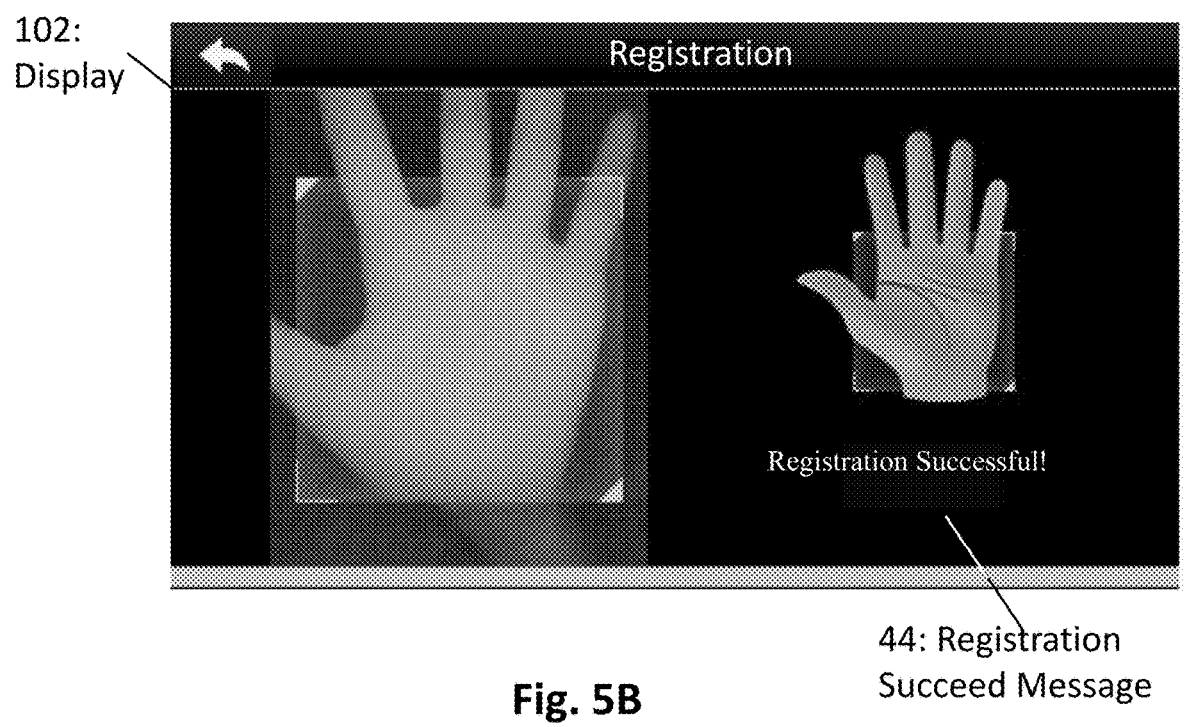
FIG. 5B shows an exemplary registration successful message, in accordance with an embodiment of the present teaching.
Figure 6A:
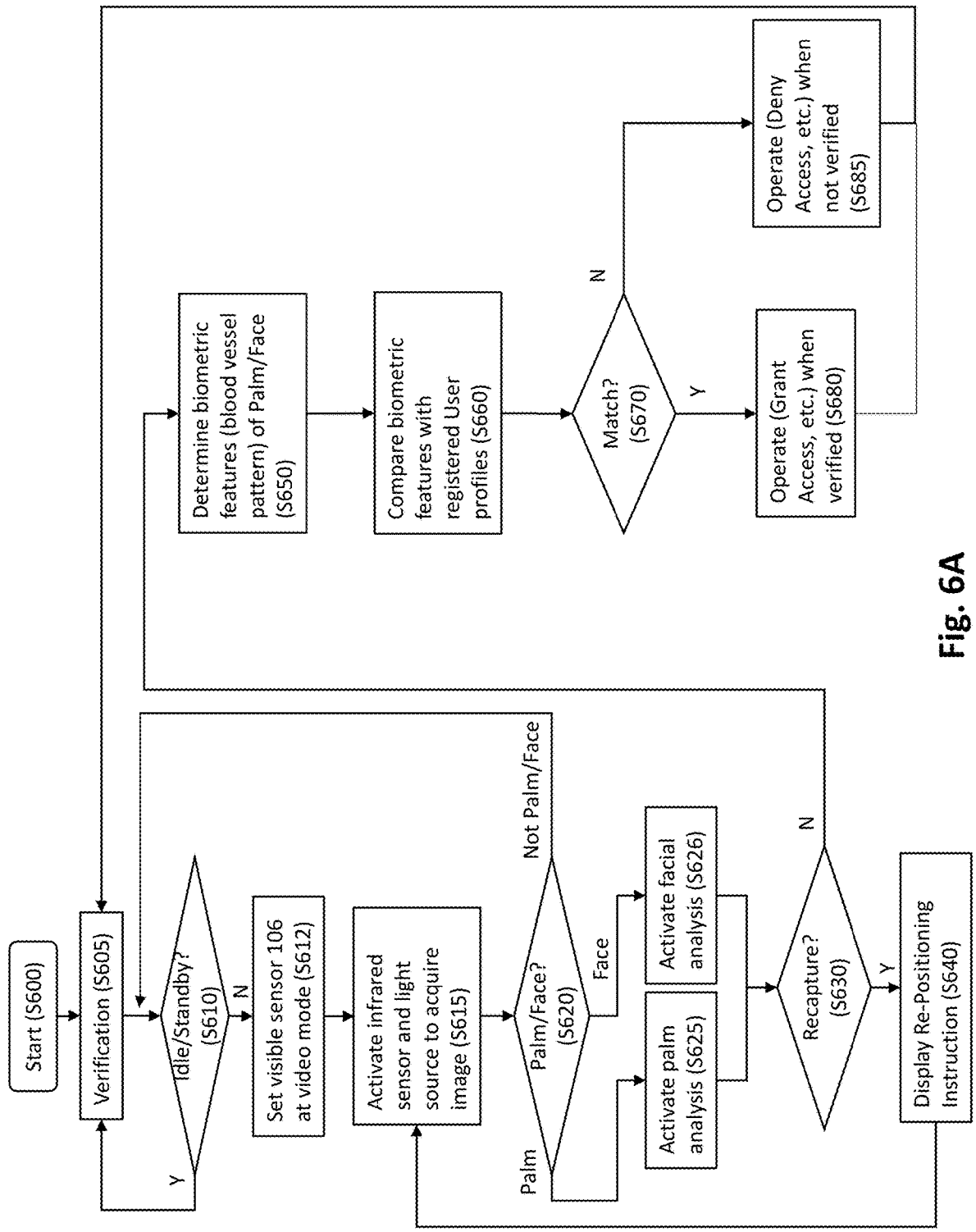
FIG. 6A is a flowchart of an exemplary process of verification, in accordance with an embodiment of the present teaching.
Figure 6B:
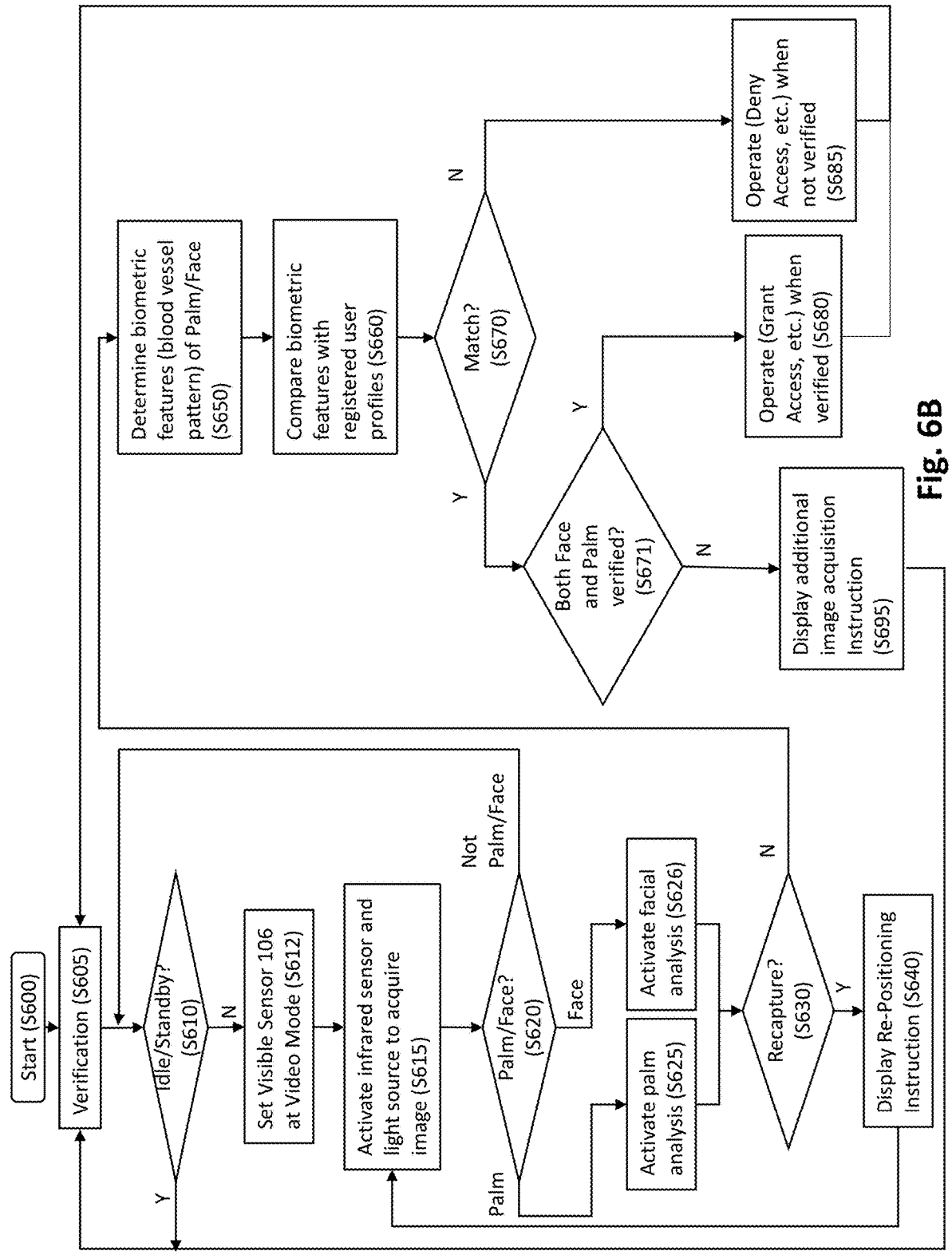
FIG. 6B is a flowchart of an exemplary process of verification, in accordance with an embodiment of the present teaching.
Figure 6C:
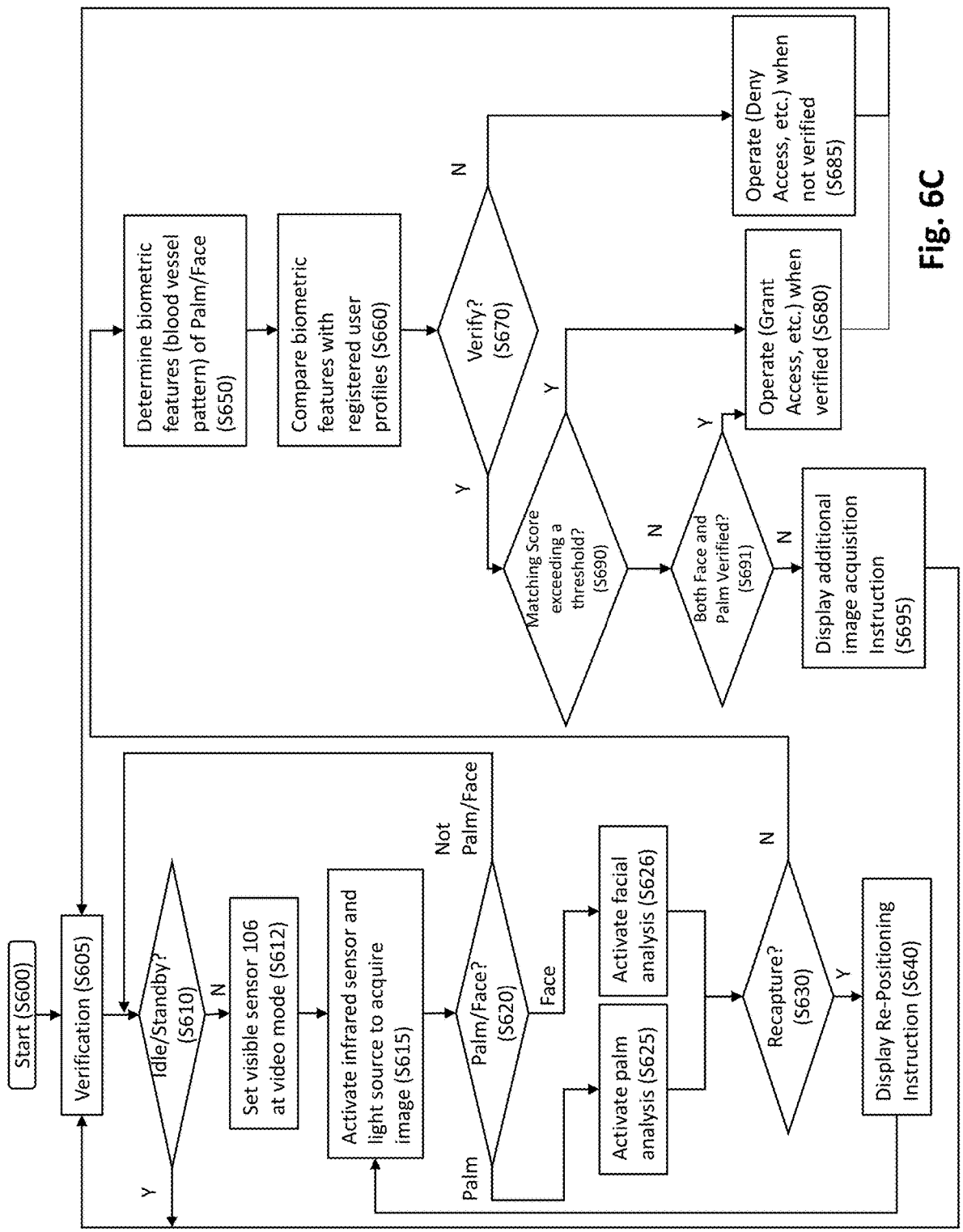
FIG. 6C is a flowchart of an exemplary process of verification, in accordance with an embodiment of the present teaching.

FIG. 5B shows an exemplary registration successful message 44, in accordance with an embodiment of the present teaching. If the authentication device 100 is set at a verification mode, the authentication device 100 may use the image acquisition of FIG. 3 to verify individuals claiming to be the registered users. In the verification mode, an individual claiming to be a registered user may place his/her palm/face in front of the authentication device 100 to allow the authentication device 100 to capture image(s) of his/her palm/face. The acquired image may be analyzed to determine biometric features associated with the individual and the biometric features may be compared with the biometric feature profiles of the registered. If a match is found, the individual may be verified as a registered user. If no match is found, it may be determined that the individual is not a registered user. In some embodiments, the authentication device 100 may inform the individual of the verification result. In some embodiments, a successful verification may lead to a permitted access to a space. FIGS. 6A-6C are flowcharts of exemplary processes of verification, in accordance with different embodiments of the present teaching.

FIG. 6A shows an exemplary process of verification which verifies an authenticated user based on only one of face and palm. The process may start form step S600. At step S605, the authentication device 100 is set at a verification mode where an individual claiming to be an authenticated user is to be verified. In this example of FIG. 6A, the verification mode is a mode that requires verifying the individual only based on one of face and palm.

At step S610 (similar to step S310), the authentication device 100 may use the visible light image sensor 106 to detect a movement. If movement is detected, at step 612 (similar to step S312), the visible light image sensor 106 may start capturing continuous video information to record actions of an object making the movement. At step S615 (similar to step S315), the infrared or near infrared light source(s) and the infrared or near infrared light image sensor 108 may be activated to acquire image(s) of the object. At step S620 (similar to step S320), the computing device 200 may use artificial intelligence technique, implemented as a program, to determine whether the object is a face or palm. As such, the authentication device 100 may determine that the individual has provided a face or a palm for verification.

At step S625 (similar to step S325), if it is determined that the individual has provided a palm for verification, the program stored in the memory 206 for biometric analysis of a palmprint or palm vein image may be invoked, and biometric features of the palm may be extracted from visible light images and/or infrared or near infrared images, and these extracted biometric features may be used for verification. At step S626 (similar to step S326), if it is determined that the individual provides a face for verification, the program stored in the memory 206 for biometric analysis of a face image may be invoked, and biometric features of the face may be extracted from visible light images and/or infrared or near infrared images, and these extracted biometric features may be used for verification. If it is determined that the individual does not provide an anticipated body part (in this example, face or palm) at step S620, the process may go back to step S610 to continue to wait for the individual to provide anticipated body part for verification.

At step S630 (similar to step S330), the computing device 200 may determine whether the quality of an acquired image is satisfactory for properly extracting anticipated features from an image. If the quality is unsatisfactory, recapture is required and the process may proceed to step S640 (similar to step S340) where the authentication device 100 may output a re-positioning instruction via the output 212.

If the quality is satisfactory, the process may proceed to step S650. At step S650, the authentication device 100 may determine biometric features (e.g., blood vessel pattern, and/or other biometric features) of the individual based on the extracted biometric features from the acquired image. At step S660, the authentication device 100 may compare the determined biometric features of the individual with the biometric feature profiles of the registered users. For example, if the extracted biometric features are associated with a face, the authentication device 100 may compare the extracted biometric features with the facial profiles of registered users. As another example, if the extracted biometric features are associated with a palm, the authentication device 100 may compare the extracted biometric features with the palm profiles of registered users.

At step 670, the authentication device 100 may determine whether a match is found. If no match is found, the authentication device 100 may determine that the individual is not a registered user, and the process may proceed to step S685 where the authentication device 100 may deny the individual's request for accessing a certain space (e.g., keeping an access door locked). If a match is found, the authentication device 100 may determine that the individual is a registered user, and the process may proceed to step S680 where the authentication device 100 may grant the individual's request for accessing a certain space (e.g., unlocking an access door).

In some embodiments, the individual may input his fingerprints via the input 210 for additional or alternative fingerprints verification or may insert an access card via the input 210 as additional or alternative verification. In these cases, in the registration process, the authentication device 100 may further include fingerprints profiles and/or access card profiles in the user profiles.

In some embodiments, verification of both of face and palm may be required to verify an individual claiming to be an authenticated user for higher security requirement. FIG. 6B shows an exemplary process of verification which verifies an authenticated user based on both of face and palm. Similar to the process in FIG. 6A, the process in FIG. 6B may start from step S600. At step S605, the authentication device 100 may be set at a verification mode where an individual claiming to be a registered user is to be verified. In the example of FIG. 6B, the verification mode is a mode that requires verifying the individual based on both of face and palm. Similar to FIG. 6A, the authentication device 100 may perform steps S605, S610, S612, S615, S620, S625, S626, S630, S640, S650, S660, S680, and S685 to acquire an image of a palm or face of an individual claiming to be a registered user, determine whether the biometric features of the individual's palm or face matches one of biometric feature profiles that have been previously generated and stored. FIG. 6B includes an additional step S671 to determine whether both of face and palm have been verified. If both face and palm have been verified, the process may proceed to step S680 where access is granted.

If not both of face and palm have been verified, the process may proceed to step S695 to display instructions to instruct the user to place the unverified face or palm in front of the authentication device 100 to continue the verification process.

The process may then go back to step S605 to confirm that the authentication device 100 is still in the verification mode, and if so, the authentication device 100 may continue to verify face or palm that has not been verified. Alternatively, the process may go back to step S615 to continue the verification by acquiring infrared or near infrared images of a face or palm that has not been verified.

With the process of FIG. 6B, only those who pass both face and palm verification may be verified and allowed to access a certain space.

In some embodiments, the authentication device 100 may verify a registered user based on both of face and palm or based on one of face and palm, depending on a matching score. FIG. 6C shows an exemplary process of verification which verifies an authenticated user based the matching score. Similar to the process in FIG. 6A, the process in FIG. 6C may start from step S600. At step S605, the authentication device 100 may be set at a verification mode where an individual claiming to be a registered user is to be verified. In the example of FIG. 6C, the verification mode is a mode that allows the authentication device 100 to determine whether to verify based on one of or both of face and palm. Similar to FIG. 6A, the authentication device 100 may perform steps S605, S610, S612, S615, S620, S625, S626, S630, S640, S650, S660, S680, and S685 to acquire an image of a palm or face of an individual claiming to be a registered user, determine whether the biometric features of the individual's palm or face matches one of biometric feature profiles that have been previously generated and stored. FIG. 6C additionally includes a step S690 to determine whether a match exceeds a certain criterion, and if so, the individual is verified to be a registered user even if one of face and palm has not been verified. For example, if 90% of the individual's face biometric features matches to a registered user's face biometric features, the authentication device 100 may determine that the individual is a registered user regardless whether both of face and palm have been verified or not.

If a match is found but does not exceed the certain criterion (e.g., less than 90% of the individual's face biometric features matches to a registered user's face biometric features), the authentication device 100 may seek if additional verification can be done. The process may proceed to S691 that determines whether both of face and palm have been verified. If not both of face and palm have been verified, the authentication device 100 may try to verify face or palm that has not been verified to seek additional verification and the process may proceed to S695 to display instructions to instruct the user to place the unverified face or palm in front of the authentication device 100 to continue the verification process.

Similarly to FIG. 6B, the process may then go back to step S605 to confirm that the authentication device 100 is still in the verification mode, and if so, the authentication device 100 may continue to verify face or palm that has not been verified. Alternatively, the process may go back to step S615 to continue the verification by acquiring infrared or near infrared images of a face or palm that has not been verified.

If both of face and palm have been verified, the authentication device 100 may determine that the individual is a registered user and/or grant access.

FIG. 7 is an illustrative diagram of an exemplary mobile device architecture that may be used to realize a specialized system implementing the present teaching in accordance with various embodiments. In this example, a device (e.g., the authentication device 100) on which the present teaching is implemented corresponds to a mobile device 700, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 700 may include one or more central processing units ("CPUs") 740 (the processor 204), one or more graphic processing units ("GPUs") 730, a display 720 (e.g., the output 212), a memory 760 (e.g., the memory 206), a communication platform 710, such as a wireless communication module, storage 990 (e.g., the storage 202), and one or more input/output (I/O) devices 740 (e.g., the input 210, the output 212). Any other suitable component, including but not limited to a system bus or a controller (not shown), may also be included in the mobile device 700. As shown in FIG. 7 a mobile operating system 770 (e.g., iOS, Android, Windows Phone, etc.), and one or more applications 780 may be loaded into memory 760 from storage 790 in order to be executed by the CPU 740. The applications 780 may include a browser or any other suitable mobile apps for managing a conversation system on mobile device 700. User interactions may be achieved via the I/O devices 740 and provided to the automated dialogue companion via network (s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming and general operation of such computer equipment and as a result the drawings should be self-explanatory.

Figure 8:
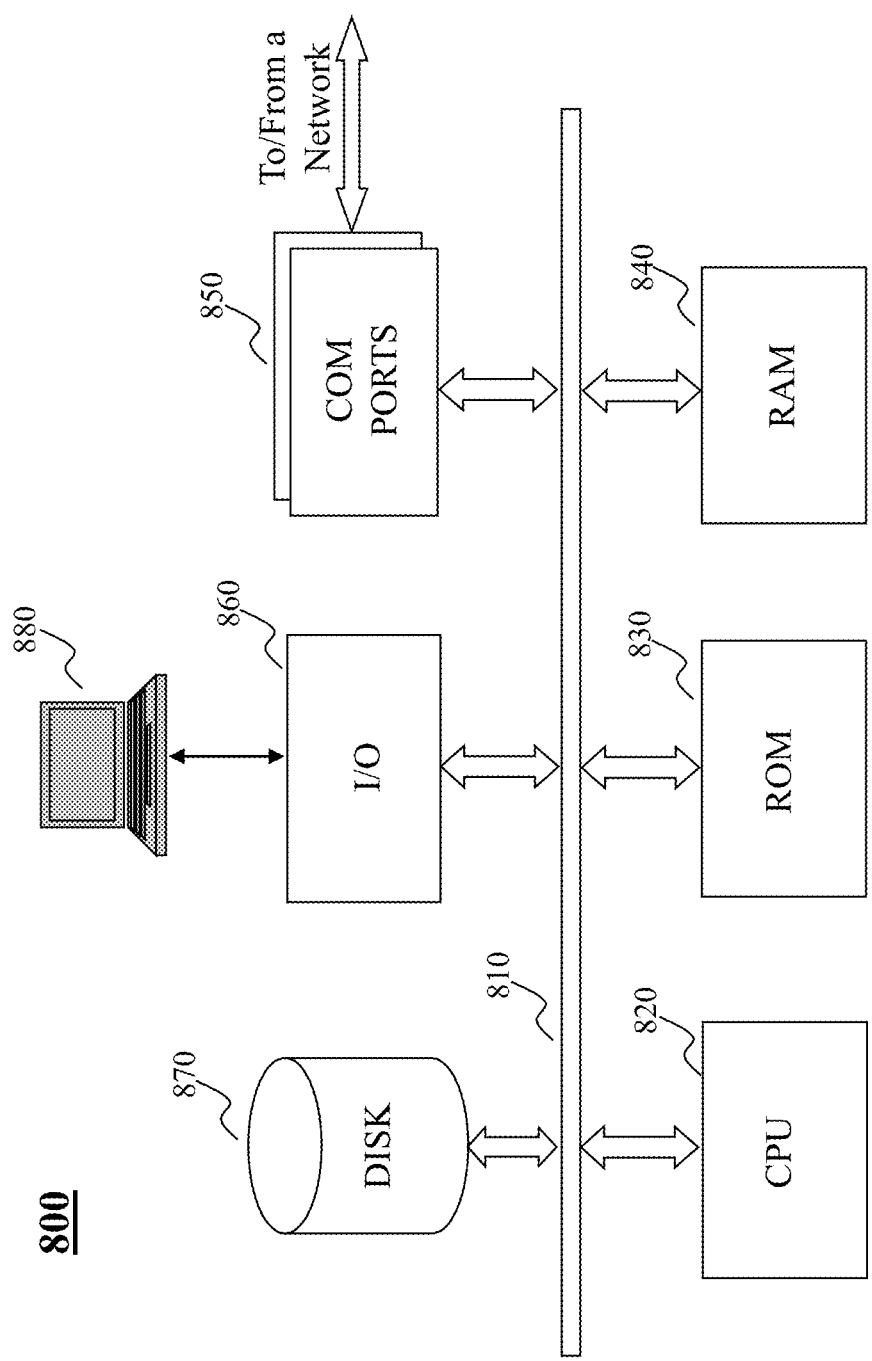
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 800 may be used to implement any component of the authentication device 100, as described herein. For example, the authentication device 100 may be implemented on a computer such as computer 800, via its hardware, software program, firmware, or a combination thereof. Although only one such computer is shown, for convenience, the computer functions relating to the authentication device 100 as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820 (e.g., the processor 204), in the form of one or more processors, for executing program instructions. The exemplary computer platform includes an internal communication bus 810, program storage and data storage (e.g., the storage 202, the memory 206) of different forms (e.g., disk 870, read only memory (ROM) 830, or random access memory (RAM) 840), for various data files to be processed and/or communicated by computer 800, as well as possibly program instructions to be executed by CPU 820. Computer 800 also includes an I/O component 860 (e.g., the input 210, the output 212), supporting input/output flows between the computer and other components therein such as user interface elements 880. Computer 800 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and s (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor and a communication platform capable of connecting to a network for user authentication, the method comprising:
   detecting a motion via a light sensitive sensor within a field of view of the light sensitive sensor;
   after the motion is detected,
   activating
      an infrared or near infrared light source that did not emit infrared or near infrared light and an infrared or near infrared sensor that did not capture images, and
      the user authentication by requesting a person appearing nearby to present biometric information of a body part of the person in a contactless manner, and
   switching the light sensitive sensor to a video mode to capture video to record actions of an object making the motion;
   acquiring, via the activated infrared or near infrared light source that emits infrared or near infrared light and the activated infrared or near infrared sensor that capture images, an image of the body part of the person positioned in a contactless manner with respect to the activated infrared or near infrared sensor;
   determining, via processing of the image, that the body part being imaged represents one of a plurality of anticipated body parts for authentication;
   extracting biometric features of the body part from the image;
   determining that a match between the extracted biometric features of the body part of the person and biometric features of a body part of one of one or more authorized users previously registered exceeds a certain criterion; and
   verifying, via the extracted biometric features of the body part, whether the person corresponds to the one of one or more authorized users previously registered.

2. The method of claim 1, wherein the plurality of body parts include a face and a palm of a person.

3. The method of claim 1, wherein the motion is detected when the person approaches.

4. The method of claim 1, wherein the step of determining comprises:
   with respect to each of the plurality of anticipated body parts,
      invoking a corresponding program configured for recognizing the anticipated body part from an input image,
      identifying, by the corresponding program, one or more features from the image, and
      deciding, based on the one or more features extracted from the image, whether the body part being imaged corresponds to the anticipated body part.

5. The method of claim 4, wherein the corresponding program configured for recognizing an anticipated body part is obtained via machine learning based on training data containing an image of the body part.

6. The method of claim 1, wherein the step of verifying comprises:
   comparing the extracted biometric features corresponding to the person with biometric representations of the one of the one or more authorized users;
   identifying a match between the extracted biometric features and one of the biometric representations of an authorized user;
   accepting the person as one of the one or more authorized users if the match is found; and
   denying the person if the match is not found.

7. The method of claim 1, further comprising registering the one or more authorized users, wherein the step of registering comprises:
   initiating a registration session for obtaining biometric representation of the one or more authorized users; and
   for each of the one or more authorized users and for each of the plurality of anticipated body parts of each authorized user,
      activating an infrared or near-infrared sensor for capturing a registration image of the anticipated body part of the authorized user,
      acquiring, via the infrared or near infrared sensor, the registration image of the anticipated body part in a contactless manner,
      extracting biometric features of the anticipated body part from the registration image,
      generating the biometric representation of the anticipated body part of the authorized user, and
      storing the biometric representation of the anticipated body part of the authorized user.

8. Machine readable medium having information recorded thereon for user authentication, the information, when read by the machine, causes the machine to perform:
   detecting a motion via a light sensitive sensor within a field of view of the light sensitive sensor;

after the motion is detected, activating
   an infrared or near infrared light source that did not emit infrared or near infrared light and an infrared or near infrared sensor that did not capture images, and
   the user authentication by requesting a person appearing nearby to present biometric information of a body part of the person in a contactless manner, and
switching the light sensitive sensor to a video mode to capture video to record actions of an object making the motion;
acquiring, via the activated infrared or near infrared light source that emits infrared or near infrared light and the activated infrared or near infrared sensor that capture images, an image of the body part of the person positioned in a contactless manner with respect to the activated infrared or near infrared sensor;
determining, via processing of the image, that the body part being imaged represents one of a plurality of anticipated body parts for authentication;
extracting biometric features of the body part from the image;
determining that a match between the extracted biometric features of the body part of the person and biometric features of a body part of one of one or more authorized users previously registered exceeds a certain criterion; and
verifying, via the extracted biometric features of the body part, whether the person corresponds to the one of one or more authorized users previously registered.

9. The machine readable medium of claim 8, wherein the plurality of body parts include a face and a palm of a person.

10. The machine readable medium of claim 8, wherein the motion is detected when the person approaches.

11. The machine readable medium of claim 8, wherein the information, when read by the machine, causes the machine to perform the step of determining by:
   with respect to each of the plurality of anticipated body parts,
      invoking a corresponding program configured for recognizing the anticipated body part from an input image,
      identifying, by the corresponding program, one or more features from the image, and
      deciding, based on the one or more features extracted from the image, whether the body part being imaged corresponds to the anticipated body part.

12. The machine readable medium of claim 11, wherein the corresponding program configured for recognizing an anticipated body part is obtained via machine learning based on training data containing an image of the body part.

13. The machine readable medium of claim 8, wherein the information, when read by the machine, causes the machine to perform the step of verifying by:
   comparing the extracted biometric features corresponding to the person with biometric representations of the one of the one or more authorized users;
   identifying a match between the extracted biometric features and one of the biometric representations of an authorized user;
   accepting the person as one of the one or more authorized users if the match is found; and
   denying the person if the match is not found.

14. The machine readable medium of claim 8, the information, when read by the machine, causes the machine to further perform registering the one or more authorized users, wherein the step of registering comprises:
   initiating a registration session for obtaining biometric representation of the one or more authorized users; and
   for each of the one or more authorized users and for each of the plurality of anticipated body parts of each authorized user,
      activating an infrared or near-infrared sensor for capturing a registration image of the anticipated body part of the authorized user,
      acquiring, via the infrared or near infrared sensor, the registration image of the anticipated body part in a contactless manner,
      extracting biometric features of the anticipated body part from the registration image,
      generating the biometric representation of the anticipated body part of the authorized user, and
      storing the biometric representation of the anticipated body part of the authorized user.

15. A system for user authentication, the system comprising:
   a light sensitive sensor configured for detecting a motion within a field of view of the light sensitive sensor;
   an infrared or near infrared sensor configured for:
      acquiring an image of a body part of a person appearing nearby positioned in a contactless manner with respect to the infrared or near infrared sensor; and
   a computing device configured for:
      after the motion is detected,
      activating
         an infrared or near infrared light source that did not emit infrared or near infrared light and the infrared or near infrared sensor that did not capture images, and
         the user authentication by requesting the person to present biometric information of the body part of the person in a contactless manner, and
      switching the light sensitive sensor to a video mode to capture video to record actions of an object making the motion;
      acquiring, via the activated infrared or near infrared light source that emits infrared or near infrared light and the activated infrared or near infrared sensor that capture images, the image of the body part of the person positioned in a contactless manner with respect to the activated infrared or near infrared sensor;
      determining, via processing of the image, that the body part being imaged represents one of a plurality of anticipated body parts for authentication;
      extracting biometric features of the body part from the image;
      determining that a match between the extracted biometric features of the body part of the person and biometric features of a body part of one of one or more authorized users previously registered exceeds a certain criterion; and
   verifying, via the extracted biometric features of the body part, whether the person corresponds to the one of one or more authorized users previously registered.

16. The system of claim 15, wherein the plurality of body parts include a face and a palm of a person.

17. The system of claim 15, wherein the motion is detected when the person approaches.

18. The system of claim 15, wherein the computing device is configured for performing the step of determining by:
   with respect to each of the plurality of anticipated body parts, invoking a corresponding program configured for recognizing the anticipated body part from an input image, identifying, by the corresponding program, one or more features from the image, and deciding, based on the one or more features extracted from the image, whether the body part being imaged corresponds to the anticipated body part.

19. The system of claim 18, wherein the corresponding program configured for recognizing an anticipated body part is obtained via machine learning based on training data containing an image of the body part.

20. The system of claim 15, wherein the computing device is configured for performing the step of verifying by:
comparing the extracted biometric features corresponding to the person with biometric representations of the one of the one or more authorized users;
identifying a match between the extracted biometric features and one of the biometric representations of an authorized user;
accepting the person as one of the one or more authorized users if the match is found; and
denying the person if the match is not found.

21. The system of claim 15, wherein the computing device is configured for further performing:
initiating a registration session for obtaining biometric representation of the one or more authorized users; and
for each of the one or more authorized users and for each of the plurality of anticipated body parts of each authorized user,
activating an infrared or near-infrared sensor for capturing a registration image of the anticipated body part of the authorized user,
acquiring, via the infrared or near infrared sensor, the registration image of the anticipated body part in a contactless manner,
extracting biometric features of the anticipated body part from the registration image,
generating the biometric representation of the anticipated body part of the authorized user, and
storing the biometric representation of the anticipated body part of the authorized user.

22. A method implemented on at least one machine including at least one processor and a communication platform capable of connecting to a network for user authentication, the method comprising:
outputting instructions to instruct an authorized user to position one of a plurality of anticipated body parts of the authorized user in front of a device for registration;
activating an infrared or near infrared light source that did not emit infrared or near infrared light and an infrared or near infrared sensor that did not capture images;
acquiring, via the activated infrared or near infrared light source that emits infrared or near infrared light and the activated infrared or near infrared sensor that capture images, one or more images of the body part of the authorized user in a contactless manner;
determining, via processing of the one or more images, that the body part being imaged represents one of the plurality of anticipated body parts;
extracting biometric features of the body part from the one or more images;
determining, based on a confidence score of each of the extracted biometric features of the body part of the person, that the extracted biometric features of the body part of the person are satisfactory for registration;
generating, based on the biometric features of the body part extracted from the one or more images, a biometric representation of the anticipated body part of the authorized user;
storing the biometric representation of the anticipated body part of the authorized user; and
performing, based on the stored biometric representation of the anticipated body part, a verification session for verifying whether a person is the authorized user, wherein the verification session comprises switching a light sensitive sensor to a video mode to capture video to record actions of the person.

23. The method of claim 22, wherein the plurality of anticipated body parts include a face and a palm.

24. The method of claim 22, wherein the step of determining comprises:
with respect to each of the plurality of anticipated body parts,
invoking a corresponding program configured for recognizing the body part from an input image,
identifying, by the corresponding program, one or more features from the one or more images, and
deciding, based on the one or more features extracted from the one or more images, whether the body part being imaged corresponds to the anticipated body part.

25. The method of claim 24, wherein the corresponding program configured for recognizing an anticipated body part is obtained via machine learning based on training data containing images of the anticipated body part.

26. The method of claim 22, wherein, when there are multiple images in the one or more images, and wherein the step of generating comprises:
extracting biometric features from the multiple images of the body part of the authorized user;
selecting, based on the extracted biometric features from the multiple images, one or more most reliable images from the multiple images; and
merging biometric features extracted from the one or more most reliable images to generate the biometric representation of the anticipated body part.

27. The method of claim 22, further comprising:
determining that each of the one or more images of the body part is not satisfactory to facilitate proper identification of biometric features of the body part from the image; and
instructing recapture of an image of the body part of the authorized user.

28. The method of claim 22, wherein the verification session comprises:
detecting a motion via the light sensitive sensor within the field of view of the light sensitive sensor;
activating, upon detecting the motion, the infrared or near infrared sensor for capturing an image of a body part of the person appearing nearby;
acquiring, via the infrared or near infrared sensor, the image of the body part of the person;
extracting biometric features of the body part from the image of the body part of the person; and
verifying whether the person corresponds to the authorized user by comparing the extracted biometric features corresponding to the person with one or more of the stored biometric representations of the authorized user.

29. A system for user authentication, the system comprising:
an infrared or near infrared sensor configured for:
acquiring one or more images of a body part of an authorized user in a contactless manner; and
a computing device configured for:
outputting instructions to instruct the authorized user to position one of a plurality of anticipated body parts of the authorized user in front of a device for registration;
activating an infrared or near infrared light source that did not emit infrared or near infrared light and the infrared or near infrared sensor that did not capture images;
acquiring, via the activated infrared or near infrared light source that emits infrared or near infrared light and the activated infrared or near infrared sensor that capture images, one or more images of the body part of the authorized user in a contactless manner;
determining, via processing of the one or more images, that the body part being imaged represents one of the plurality of anticipated body parts;
extracting biometric features of the body part from the one or more images;
determining, based on a confidence score of each of the extracted biometric features of the body part of the person, that the extracted biometric features of the body part of the person are satisfactory for registration;
generating, based on the biometric features of the body part extracted from the one or more images, a biometric representation of the anticipated body part of the authorized user;
storing the biometric representation of the anticipated body part of the authorized user; and
performing, based on the stored biometric representation of the anticipated body part, a verification session for verifying whether a person is the authorized user, wherein the verification session comprises switching a light sensitive sensor to a video mode to capture video to record actions of the person.

30. The system of claim 29, wherein the plurality of anticipated body parts include a face and a palm.

31. The system of claim 29, wherein the computing device is configured for determining whether the body part being imaged represents one of the plurality of anticipated body parts by:
with respect to each of the plurality of anticipated body parts,
invoking a corresponding program configured for recognizing the body part from an input image,
identifying, by the corresponding program, one or more features from the one or more images, and
deciding, based on the one or more features extracted from the one or more images, whether the body part being imaged corresponds to the anticipated body part.

32. The system of claim 31, wherein the corresponding program configured for recognizing an anticipated body part is obtained via machine learning based on training data containing images of the anticipated body part.

33. The system of claim 29, wherein, when there are multiple images in the one or more images, and wherein the computing device is configured for generating the biometric representation of the anticipated body part of the authorized user by:
extracting biometric features from the multiple images of the body part of the authorized user;
selecting, based on the extracted biometric features from the multiple images, one or more most reliable images from the multiple images; and
merging biometric features extracted from the one or more most reliable images to generate the biometric representation of the anticipated body part.

34. The system of claim 29, wherein the computing device is configured further for:
determining that each of the one or more images of the body part is not satisfactory to facilitate proper identification of biometric features of the body part from the image; and
instructing recapture of an image of the body part of the authorized user.

35. The system of claim 29, wherein the verification session comprises:
detecting a motion via the light sensitive sensor within the field of view of the light sensitive sensor;
activating, upon detecting the motion, the infrared or near infrared sensor for capturing an image of a body part of the person appearing nearby;
acquiring, via the infrared or near infrared sensor, the image of the body part of the person;
extracting biometric features of the body part from the image of the body part of the person; and
verifying whether the person corresponds to the authorized user by comparing the extracted biometric features corresponding to the person with one or more of the stored biometric representations of the authorized user.

* * * * *